(12) United States Patent
Banu et al.

(10) Patent No.: US 9,485,770 B2
(45) Date of Patent: **\*Nov. 1, 2016**

(54) TECHNIQUES FOR ACHIEVING HIGH AVERAGE SPECTRUM EFFICIENCY IN A WIRELESS SYSTEM

(71) Applicant: Blue Danube Systems, Inc., New Providence, NJ (US)

(72) Inventors: Mihai Banu, New Providence, NJ (US); Yiping Feng, North Brunswick, NJ (US); David Poticny, New Providence, NJ (US)

(73) Assignee: BLUE DANUBE SYSTEMS, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,676

(22) Filed: Aug. 11, 2015

(65) Prior Publication Data

US 2015/0351086 A1 Dec. 3, 2015

Related U.S. Application Data

(62) Division of application No. 13/442,561, filed on Apr. 9, 2012, now Pat. No. 9,161,360.

(60) Provisional application No. 61/472,900, filed on Apr. 7, 2011.

(51) Int. Cl.
*H04B 7/00* (2006.01)
*H04W 72/04* (2009.01)
(Continued)

(52) U.S. Cl.
CPC ......... *H04W 72/046* (2013.01); *H04B 7/0413* (2013.01); *H04B 7/0691* (2013.01); *H04B 7/0695* (2013.01); *H04W 8/186* (2013.01); *H04W 16/14* (2013.01); *H04W 16/28* (2013.01)

(58) Field of Classification Search
USPC .......................................................... 455/513
See application file for complete search history.

(56) References Cited

U.S. PATENT DOCUMENTS

| | | | | |
|---|---|---|---|---|
| 7,230,931 B2 * | 6/2007 | Struhsaker | ............. | H01Q 1/246 370/280 |
| 8,511,100 B2 * | 8/2013 | Laskaris | ............... | F25B 25/005 62/259.2 |

(Continued)

FOREIGN PATENT DOCUMENTS

| | | |
|---|---|---|
| EP | 1976149 A1 | 10/2008 |
| JP | 07-87011 | 3/1995 |

(Continued)

OTHER PUBLICATIONS

International Search Report issued for PCT/US12/032734, dated Jul. 23, 2012 (1 page).

(Continued)

*Primary Examiner* — Ankur Jain
(74) *Attorney, Agent, or Firm* — Wilmer Cutler Pickering Hale and Dorr LLP

(57) ABSTRACT

Techniques for achieving high average spectrum efficiency in a wireless system are disclosed. In one particular embodiment, the techniques may be realized as a method of communicating with a wireless station comprising defining a plurality of beams to be generated by a beam-forming device, defining a set of beam groups wherein each beam group is a different subset of beams of the plurality of beams; repeatedly cycling through the set of beam groups by sequentially generating each group of beams among the set of beam groups; identifying a beam group among the set of beam groups which yields a best communication link with a wireless station; and scheduling communications with the wireless station to occur via the identified beam group when the identified beam group is being generated.

21 Claims, 21 Drawing Sheets

(51) Int. Cl.
*H04W 16/14* (2009.01)
*H04W 8/18* (2009.01)
*H04W 16/28* (2009.01)
*H04B 7/04* (2006.01)
*H04B 7/06* (2006.01)

(56) References Cited

U.S. PATENT DOCUMENTS

| | | | |
|---|---|---|---|
| 2005/0206564 A1* | 9/2005 | Mao | H01Q 3/2682 342/377 |
| 2006/0120477 A1* | 6/2006 | Shen | H04B 7/024 375/267 |
| 2007/0135168 A1* | 6/2007 | Liu | H01Q 3/40 455/562.1 |
| 2007/0249402 A1* | 10/2007 | Dong | H04B 7/0408 455/562.1 |
| 2008/0242251 A1* | 10/2008 | Kraemer | H01Q 1/246 455/272 |
| 2009/0233545 A1* | 9/2009 | Sutskover | H01Q 3/26 455/25 |
| 2012/0142280 A1* | 6/2012 | Banu | H04B 7/0682 455/69 |

FOREIGN PATENT DOCUMENTS

| | | |
|---|---|---|
| JP | 2003-244054 A | 8/2003 |
| JP | 2009-534954 A | 9/2009 |
| WO | WO-2007066074 A1 | 6/2007 |
| WO | WO-2007124460 A1 | 11/2007 |

OTHER PUBLICATIONS

Japanese Office Action corresponding to Japanese Application No. 2014-504069, dated Jan. 15, 2014, 5 pages.
No Author, "MIMO Transmission Schemes for LTE and HPSA Networks," 3G Americas, 50 pages, Jun. 2009.
R. Mailloux, "Phased Array Antenna Handbook," 2nd Edition, Artech House, 515 pages, 2005.
Supplementary European Search Report issued in EP 12767945.4, mailed Sep. 24, 2014, (7 pages).

* cited by examiner

TECHNIQUES FOR ACHIEVING HIGH AVERAGE SPECTRUM EFFICIENCY IN A WIRELESS SYSTEM

CROSS-REFERENCE TO RELATED APPLICATIONS

This patent application is a divisional patent application of U.S. patent application Ser. No. 13/442,561, filed Apr. 9, 2012, which claims priority to U.S. Provisional Patent Application No. 61/472,900, filed Apr. 7, 2011, each of which is hereby incorporated by reference herein in its entirety.

FIELD OF THE DISCLOSURE

The present disclosure relates generally to wireless systems such as cellular or wireless local area networks and, more particularly, to techniques for achieving high average spectrum efficiency in a wireless system.

BACKGROUND OF THE DISCLOSURE

Spectrum efficiency of a digital wireless communication link is a figure of merit defined as the number of bits of information transmitted per unit of time (second), per unit of bandwidth (Hz), without exceeding a prescribed bit error rate. Spectrum efficiency is measured in bits-per-second-per-Hertz, often written as "bits/s/Hz". The larger the spectrum efficiency of a wireless link, the more packed the transmitted information in time and bandwidth. A central result of information theory relates spectrum efficiency to the signal quality of the communication channel, usually expressed as signal-to-noise-plus-interference-ratio, or SNIR: the larger SNIR the larger spectrum efficiency.

Theoretically, each wireless transmission between two stations (e.g. a base station and a mobile station in a cellular system) could support all spectrum efficiencies starting from zero (no information transmitted) up to a maximum value determined by the quality of the communication channel during that transmission. Practically, digital wireless systems do not support a continuum of data rates but rather a finite number of data rates, usually specified by standards. Each data rate corresponds to specific spectrum efficiency, with the maximum data rate giving the peak or maximum spectrum efficiency possible for any transmission in the system considered. Operating the wireless system at peak spectrum efficiency for all transmissions, would yield the maximum amount of data that could transfer through wireless connections in the system. This is the maximum capacity of the system. Maximum capacity and peak spectrum efficiency would result if all mobiles were situated next to the base station and all had high channel quality at all times. The actual system capacity, i.e., the actual amount of data that transfers through wireless connections is usually much less than the maximum capacity, as will be discussed next.

Typically, the wireless channel quality in wireless systems changes from transmission to transmission. This effect is especially pronounced in cellular systems where mobiles change their physical location over time and even during transmissions. In this case, rather than focusing on the spectrum efficiency per transmission as an indication of the actual network capacity, it is more meaningful to calculate or measure the average spectrum efficiency for the entire cell over a period. Since all transmissions originate or end in the base station, the cell average spectrum efficiency is directly related to the base station average wireless data traffic.

From inception, commercial cellular systems have operated with low average spectrum efficiency. However, the modest bit-rate demands of traditional voice-dominated communications allowed wireless carriers to mask this shortcoming of their networks for many years. In addition, extra RF spectrum was available to support increases in the wireless traffic without improving the average spectrum efficiency.

The initial limitation of spectrum efficiency in cellular systems was the use of very simple modulation techniques, which only packed very low numbers of bits per allocated RF spectrum. As networks evolved from one generation to another, progressively more sophisticated and more efficient modulation techniques were introduced, improving the peak spectrum efficiency by a large amount, but the network average spectrum efficiency remained low. The reason for this poor average performance is the very nature of the air interface with tiny signals, high noise, presence of interferers, multipath fading, etc.

Following the previous trend, Fourth Generation (4G) wireless systems such as WiMax and LTE (Long Term Evolution) have pushed the transmission schemes to such levels of sophistication that further improvements are unlikely without major penalties in cost and power especially for the mobile devices. For example, 4G systems use multiple RF transceiver schemes called MIMO (Multiple-Input-Multiple-Output) schemes. These employ heavy digital signal processing on several antenna signals, specifically targeting very high peak spectrum efficiency. Nevertheless, even for these systems the average spectrum efficiency remains low compared to the peak efficiency. As already mentioned, this is due to the poor quality of the average communication channel of the air interface. Digital signal processing alone on several antenna signals is not a viable solution to obtaining a substantial increase in overall average spectrum efficiency.

The introduction of smart phones, wireless tablets and other mobile devices capable of accepting and generating large amounts of digital information has produced a profound impact on wireless networks. This, in combination with the heavy use of data hungry wireless applications, is driving the capacity demands of wireless networks to unprecedented levels. The utilization of the limited RF spectrum by traditional low average efficiency methods, including those of existing 4G systems, is no longer appropriate. Operating the networks with average spectrum efficiency, which is far from the peak spectrum efficiency theoretically possible, is simply too wasteful. Furthermore, expanding the traditional wireless networks to accommodate the ever-increasing capacity demands is uneconomical.

In view of the foregoing, it may be understood that there may be significant problems and shortcomings associated with traditional wireless networks.

SUMMARY OF THE DISCLOSURE

Embodiments of the present disclosure include techniques for solving the problem of low average spectrum efficiency in traditional wireless communications by using a new base station architecture and functionality. The new base station architecture includes a radio front-end RF capability for creating multiple, agile beam patterns such as pencil beams steerable in azimuth and elevation according to programmable spatial scanning. This front-end capability requires the use of multiple antennas for electronic beam forming, steering, and scanning. The new functionality contains new mobile scheduling capabilities and the use of appropriate channel matrix processing software.

In general, the various embodiments of the present disclosure provide two fundamental changes from traditional two-way wireless communication schemes using multiple antennas: a) the introduction of sector scanning with multiple beam patterns by the base station, and b) the introduction of time coordination between mobile operation and the base station sector scanning process. In addition, as compared to traditional systems, the embodiments of this disclosure may use (1) substantially higher effective multiple-antenna gain and stronger spatial filtering capabilities (2) substantially higher agility in radiation pattern changes, and (3) more flexibility in forming radiation patterns.

In accordance with one embodiment of the present disclosure, there is provided a wireless base station system comprising a signal-processing unit connected to an antenna array. The base station system creates at least one but typically many simultaneous radiation patterns, independently programmable in shape and independently steerable with high agility, each radiation pattern being available to transmit and receive independent information. The base station system scans the space with some of the radiation patterns, leaving the other radiation patterns static, and transmits and receives information to and from mobile units through the radiation patterns, in synchronization with the respective scanning processes.

In accordance with another embodiment of the present disclosure, there is provided a wireless base station system comprising a signal-processing unit connected to a phased array. The base station system creates at least one but typically many simultaneous radiation patterns, independently programmable in shape and independently steerable with high agility, each radiation pattern being available to transmit and receive independent information. The base station system scans the space with some of the radiation patterns, leaving the other radiation patterns static, and transmits and receives information to and from mobile units through the radiation patterns, in synchronization with the respective scanning processes.

In accordance with another embodiment of the present disclosure, there is provided a wireless base station system comprising a signal-processing unit connected to a phased array. The base station system creates at least one but typically many simultaneous radiation patterns, independently programmable in shape and independently steerable with high agility in azimuth and elevation, each radiation pattern being available to transmit and receive independent information. The base station system scans the space with some of the radiation patterns, leaving the other radiation patterns static, and transmits and receives information to and from mobile units through the radiation patterns, in synchronization with the respective scanning processes.

In accordance with yet another embodiment of the present disclosure, there is provided a wireless base station system comprising a signal-processing unit connected to a phased array. The base station system creates at least one but typically many simultaneous radiation patterns, independently programmable in shape and independently steerable with high agility, each radiation pattern being available to transmit and receive independent information. At least some of the radiation patterns are narrow pencil beams. The base station system scans the space with some of the radiation patterns, leaving the other radiation patterns static, and transmits and receives information to and from mobile units through the radiation patterns, in synchronization with the respective scanning processes.

In accordance with yet another embodiment of the present disclosure, there is provided a wireless base station system comprising a signal-processing unit connected to a phased array. The base station system creates at least one but typically many simultaneous radiation patterns, independently programmable in shape and independently steerable with high agility, each radiation pattern being available to transmit and receive independent information. At least some of the radiation patterns are narrow pencil beams steerable in azimuth and elevation. The base station system scans the space with some of the radiation patterns, leaving the other radiation patterns static, and transmits and receives information to and from mobile units through the radiation patterns, in synchronization with the respective scanning processes.

In accordance with yet another embodiment of the present disclosure, there is provided a wireless base station system comprising a signal-processing unit connected to a phased array. The base station system creates at least one but typically many simultaneous radiation patterns, independently programmable in shape and independently steerable with high agility, each radiation pattern being available to transmit and receive independent information. At least some of the radiation patterns are narrow pencil beams. The base station system scans the space with the narrow pencil beams, leaving the other radiation patterns static, and transmits and receives information to and from mobile units through the radiation patterns, in synchronization with the respective scanning processes.

In accordance with yet another embodiment of the present disclosure, there is provided a wireless base station system comprising a signal-processing unit connected to a phased array. The base station system creates at least one but typically many simultaneous radiation patterns, independently programmable in shape and independently steerable with high agility, each radiation pattern being available to transmit and receive independent information. At least some of the radiation patterns are narrow pencil beams. The base station system scans the space with the narrow pencil beams, leaving the other radiation patterns static, and transmits and receives payload information to and from mobile units through the narrow pencil beams, in synchronization with the respective scanning processes.

In accordance with yet another embodiment of the present disclosure, there is provided a wireless base station system comprising a signal-processing unit connected to a phased array. The base station system creates at least one but typically many simultaneous radiation patterns, independently programmable in shape and independently steerable with high agility, each radiation pattern being available to transmit and receive independent information. At least some of the radiation patterns are narrow pencil beams. The base station system scans the space with the narrow pencil beams, leaving the other radiation patterns static, and transmits and receives payload information to and from mobile units through the narrow pencil beams, in synchronization with the respective scanning processes. Furthermore, the base station system communicates two-way control information with the mobile units through the narrow pencil beams.

In accordance with yet another embodiment of the present disclosure, there is provided a wireless base station system comprising a signal-processing unit and a phased array. The base station system creates at least one but typically many simultaneous radiation patterns, independently programmable in shape and independently steerable with high agility, each radiation pattern being available to transmit and receive independent information. At least some of the radiation patterns are narrow pencil beams. The base station system scans the space with the narrow pencil beams, leaving the other radiation patterns static, and transmits and receives payload information to and from mobile units through the narrow pencil beams, in synchronization with the respective scanning processes. Furthermore, the base station system communicates two-way control information with the mobile units through the static radiation patterns.

In accordance with yet another embodiment of the present disclosure, there is provided a wireless base station system comprising a signal-processing unit and a phased array. The base station system creates at least one but typically many simultaneous radiation patterns, independently programmable in shape and independently steerable with high agility, each radiation pattern being available to transmit and receive independent information. The radiation patterns are narrow pencil beams, sufficient in number and designed such that when all beams are considered, all space scanned by the base station system has at least low level radiation coverage at all times. In other words, there are enough narrow pencil beams and there is enough spillover radiation from each narrow pencil beam to cover all space at all times. The base station system scans the space with the narrow pencil beams, and transmits and receives payload information to and from mobile units through the narrow pencil beams, in synchronization with the respective scanning processes. Furthermore, the base station system communicates two-way control information with the mobile units through all narrow pencil beams.

In accordance with yet another embodiment of the present disclosure, there is provided a wireless base station system comprising a signal-processing unit and an antenna array or a phased array. The base station system creates at least one but typically many simultaneous radiation patterns, independently programmable in shape and independently steerable with high agility, each radiation pattern being available to transmit and receive independent information. The base station system scans the space with some of the radiation patterns, leaving the other radiation patterns static, and transmits and receives information to and from mobile units through the radiation patterns in synchronization with the respective scanning processes. The information transmitted and received through the radiation patterns is also processed in the signal-processing unit of the base station system by a channel-matrix processing algorithm, which removes the mutual interference between the radiation patterns.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to.

DETAILED DESCRIPTION OF EMBODIMENTS

Traditional Mobile Wireless Systems

Figure 1:
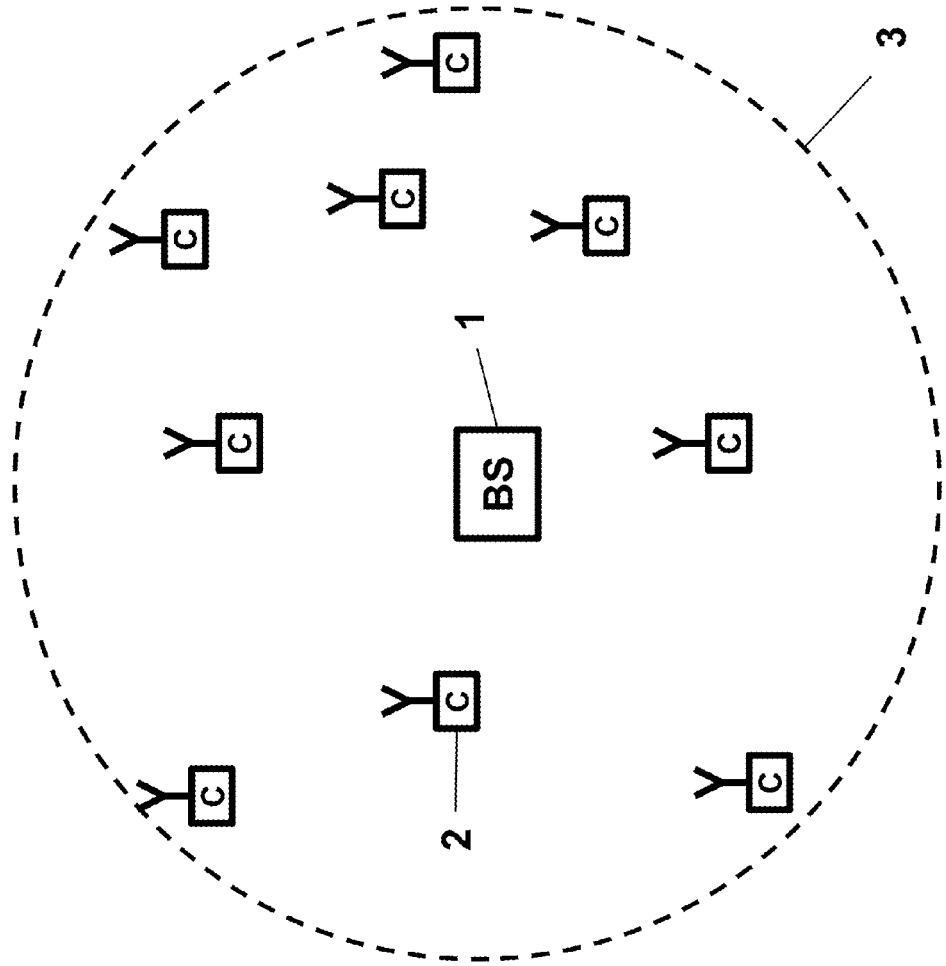
FIG. 1 depicts a diagram of a wireless cell.

The basic building block of a modern mobile digital wireless system such as cellular or WiFi is a cell 3, as illustrated in FIG. 1. A base station 1, called a base station system, provides wireless access to mobile or fixed stations within the cell, such as station 2, jointly called wireless clients. The meaning of wireless access is the system capability of two-way wireless communications between the base station and the wireless clients. The base station may be connected to larger networks hierarchically (not shown in FIG. 1), ultimately including the worldwide telephone network, the internet, etc., thus linking wireless clients to these networks.

For simplicity, the base station system in FIG. 1 is shown in the center of the cell coverage area 3 and the cell shape is shown as circular. This is an ideal situation, used here only to illustrate the principle and limitations of cellular operation. In most practical cases, natural or manmade obstacles such as hills, rocks, trees, buildings, bridges, etc. create highly irregular and complicated wireless propagation paths. These are taken into consideration when positioning the base stations for optimum coverage and the resulting cells have irregular shapes, in general.

Figure 2:
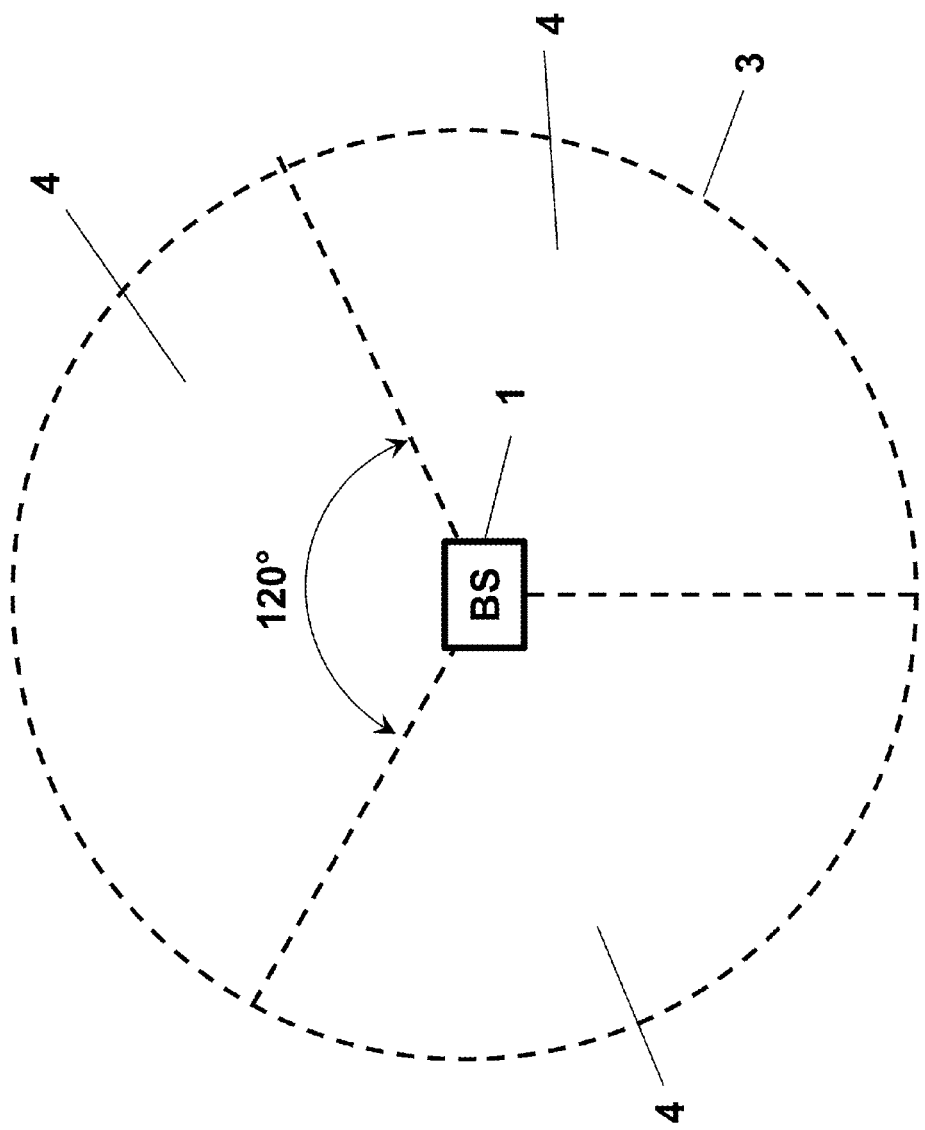
FIG. 2 depicts a diagram of a wireless cell split into three 120° sectors.

Furthermore, in most cases it is highly advantageous for maximizing the coverage area of a base station to split the 360° region around it into three 120° sectors. This is shown in FIG. 2. Typically, separate base station antennas with 120° coverage serve each sector 4. A sector antenna 11 on a cell tower 5 is shown in FIG. 3(a).

Figure 3:
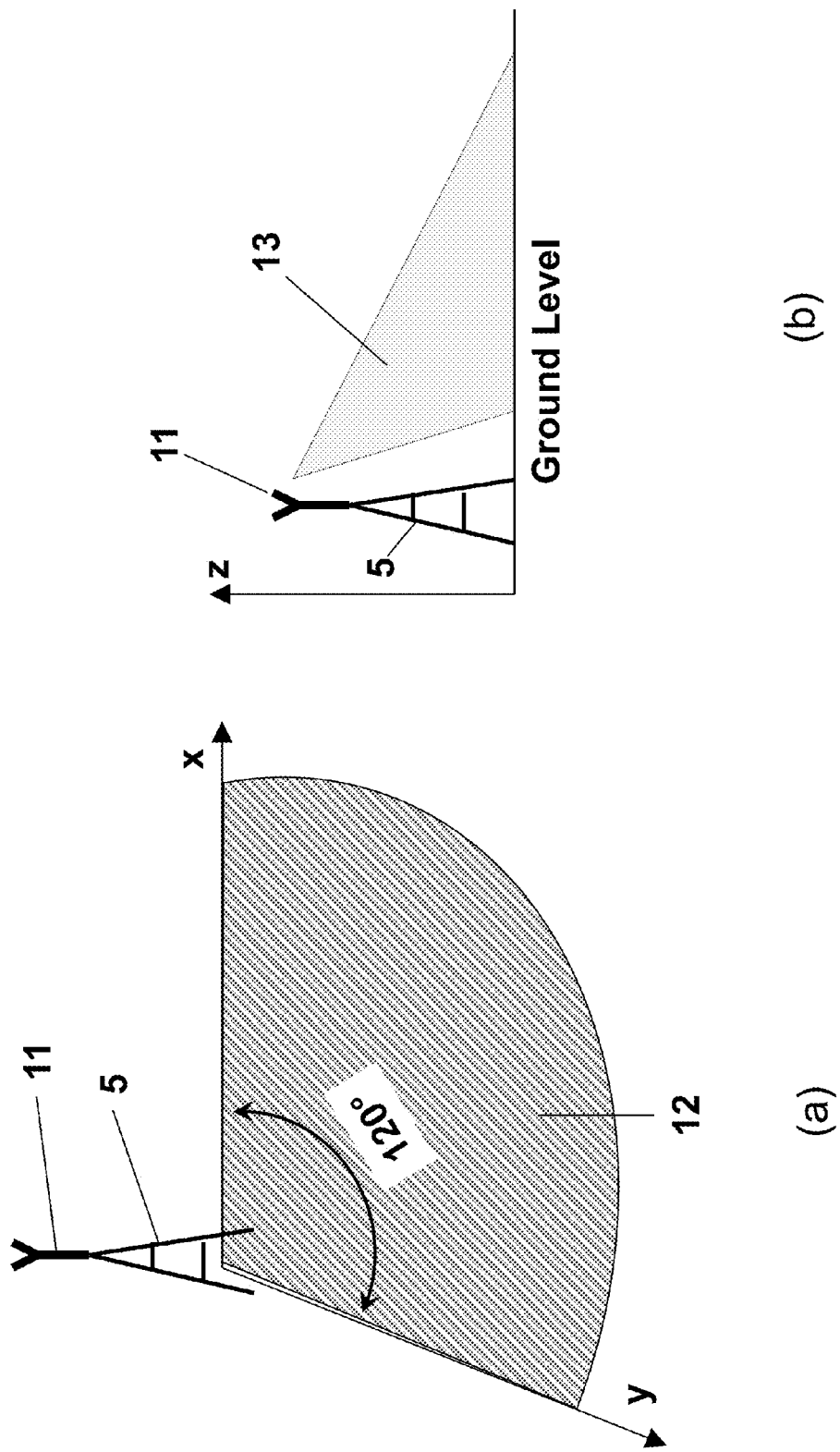
FIG. 3 depicts a diagram of typical sector antenna radiation pattern: (a) sector coverage in the horizontal "x-y" plane, (b) radiation pattern in the vertical "z-ground" plane.

A typical sector antenna has radiation pattern as illustrated in FIGS. 3(a) and 3(b). On the horizontal plane, the radiation ground coverage 12 is over the entire sector. On the vertical plane, the radiation points mostly towards the ground, as shown by antenna radiation section 13. This avoids wasting energy towards upward directions where there are no wireless clients. The entire radiation pattern of the sector antenna can be described as a beam, which is 120° wide in the horizontal plane and much narrower in the vertical plane. It is important to emphasize that this radiation pattern is valid for both transmit and receive. For example, radiation section 13 in FIG. 3(b) is the region through which antenna transmits RF power in transmit mode and receives RF power in receive mode. Any mobile outside the radiation pattern, cannot reach the base station or be reached by the base station.

Figure 4:
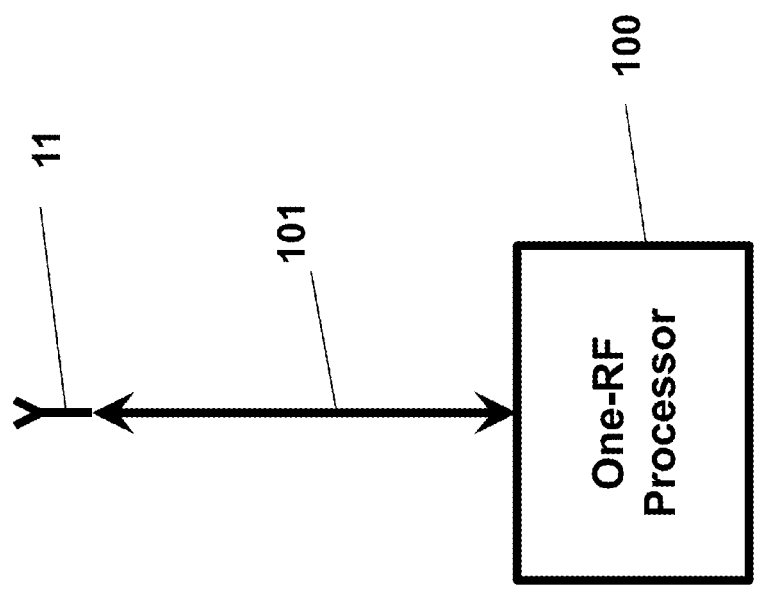
FIG. 4 depicts a diagram of a base station system with single antenna.

FIG. 4 shows a base station system comprising a sector antenna 11, a signal processing subsystem 100 called one-RF processor, and an interconnect network 101 called a one-RF full-duplex interface. The sector antenna 11 transmits or receives RF energy originating or terminating in the one-RF processor 100. The subsystem 100 contains all RF, analog, and digital processing functionality necessary in a wireless base station. An essential aspect of this subsystem is that it processes the signals to and from a single antenna, hence the name one-RF processor. Similarly, the one-RF full-duplex interface 101 carries signals to/from a single antenna (hence the name one-RF) in both receive and transmit directions (hence the name full-duplex).

In practice, wireless carriers use separate sector antennas for receive and transmit, and quite often they use two receive sector antennas for diversity. Other similar configurations are possible. However, in conventional systems, these multiple antennas are still connected to a one-RF processor, and, in principle, they perform the function of a single antenna as in FIG. 4. Naturally, a one RF processor using several antennas per sector has additional RF circuits (radios, etc.) compared to a one-RF processor using a single antenna per sector, but this practical detail is not included in the definition of a one-RF processor. The fundamental and defining property of a one-RF processor is that it transmits or receives a single RF signal, albeit through several physical sector antennas in some practical deployments. For this reason and for the purpose of this specification, it will be sufficient to consider that a one-RF processor is connected to a single sector antenna as in FIG. 4, without any loss of generality in the following description.

In addition, for the rest of this specification, system concepts are discussed either for sectors in some instances or for full cells in other instances. This is done only for the purpose of presentation clarity and not as any limitation of the respective concepts, which are valid in either case.

Spectrum Efficiency in Traditional Wireless Systems

As introduced before, spectrum efficiency is a figure of merit defined as the number of bits of information transmitted per second, per Hz, without exceeding a prescribed bit error rate. In wireless systems, the maximum spectrum efficiency, also known as peak spectrum efficiency, is set by the modulation format specified by standards.

In practice, mobile wireless systems only very seldom operate at peak spectrum efficiency. In fact, the average spectrum efficiency is typically very low as compared to the peak efficiency. The main reason for this major difference is the very nature of wireless transmission. The SNIR of the communication signals varies widely within the cell. Mobiles close to the tower antenna and/or in direct line of sight usually experience far better signal quality than those at the edge of the cell or in the "RF shadow" of buildings, etc. Furthermore, multipath effects create large SNIR variations called fading, which are time variant.

Figure 5:
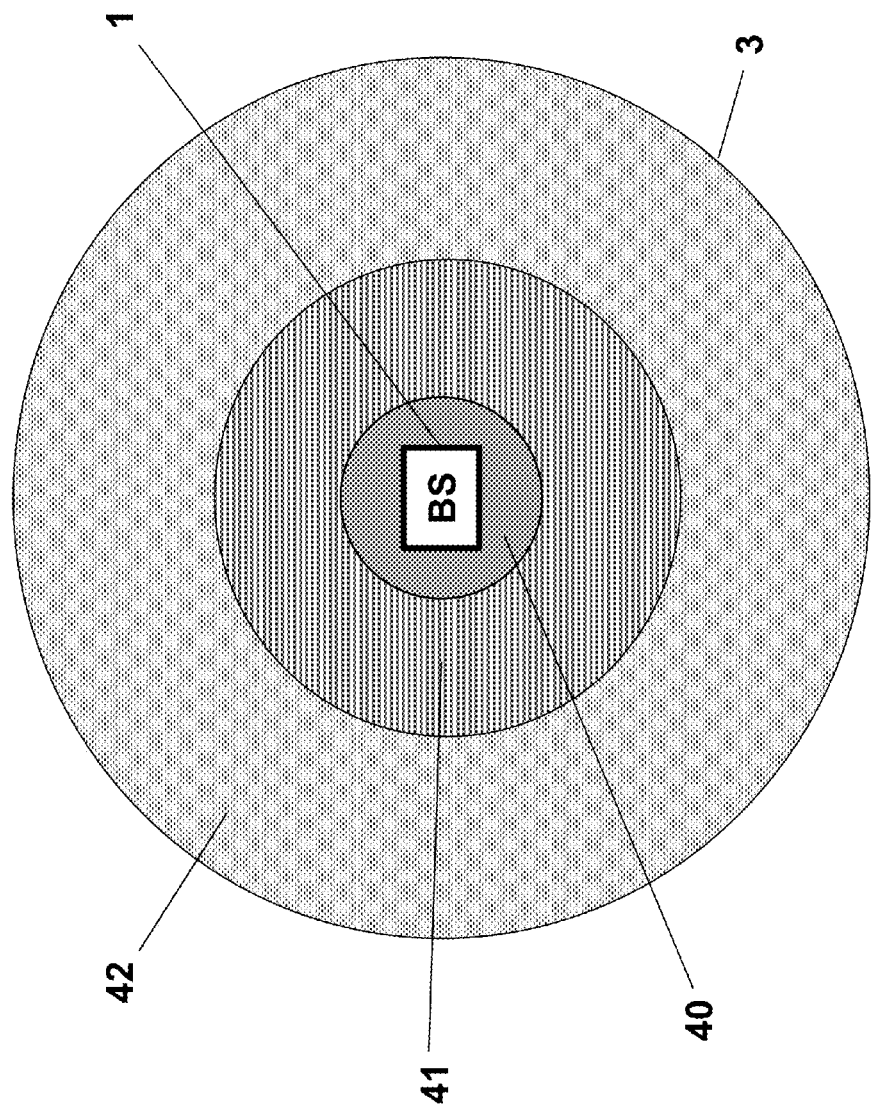
FIG. 5 depicts a simplified diagram of signal strength distribution within a traditional wireless cell.

FIG. 5 illustrates the large SNIR variation within a cell in a simplified manner, by showing three areas of decreasing signal quality: a small strong-signal area 40, a slightly larger moderate-signal area 41, and a large weak-signal area 42. In the real case, there is a non-uniform continuum of signal quality variation throughout the cell. However, the simplification in FIG. 5 is sufficient to prove that the average spectrum efficiency is low, compared to the peak spectrum efficiency.

Typical wireless systems handle large variation of SNIR in the cell by supporting many data rates from very low rates, possible with low SNIR, to the peak rate, possible only when high SNIR is available. Regarding the diagram in FIG. 5, peak or close to peak rates are used only in the small strong-signal area 40, low to moderate rates are used in the moderate-signal area 41, and low to very low rates (minimum allowed by standard before call drops) are used in the large weak-signal area 42. Clearly, the average spectrum efficiency is small compared to the peak theoretical efficiency, the latter being calculated assuming that the strong signal area covers the entire cell. In other words, since most mobiles communicate at low data rates most of the time—a low average spectrum efficiency results. It is important to notice that this problem is in addition to not in lieu of other spectrum efficiency parameters such as modulation.

Improving Spectrum Efficiency in Single Antenna Systems

Despite the signal-quality problem illustrated in FIG. 5, in the past, wireless carriers have been able to provide adequate communication services because a) the information traffic has been dominated by voice, requiring low bit rates, b) carriers had extra RF spectrum available, and c) better utilization of the available spectrum was possible through more efficient modulation techniques. The first two saving circumstances were only temporary. Today, and in the foreseeable future, the wireless traffic, dominated by data hungry applications, such as video transmission, is increasing at an unprecedented rate. In addition, RF spectrum has become scarce and it is a limited resource, fundamentally.

Updating the wireless systems with more efficient modulation techniques from one generation to another (e.g. 1G, 2G, 3G, 4G cellular system generations) did address the issue of increasing spectrum efficiency, but it too has been only a temporary solution with limited scalability. The reason is that more spectrally efficient modulation techniques require higher SNIR. In addition to the fundamental SNIR variation problems throughout the cell as discussed earlier, the mobile cost and power dissipation increase rapidly with increases in SNIR. Raising the system SNIR requirement beyond the already high levels in 4G is highly unlikely, considering this fact alone. Furthermore, boosting the system spectrum efficiency through increases in SNIR (more advanced modulation) is fundamentally limited to a slowly growing logarithmic law imposed by Shannon's information theory. Therefore, the option of obtaining better spectral efficiency through modulation has reached the point of diminishing returns beyond 4G wireless systems.

As expected, due to the cell SNIR problem illustrated in FIG. 5, and despite using very spectrally efficient modulation, the average spectrum efficiency of the 4G wireless systems such as LTE (Long Term Evolution) is low. For example, the 4G Americas forum (formerly 3G Americas) predicts LTE average spectrum efficiency of only 1.4 bits/s/Hz for a conventional single antenna (as defined with regard to FIG. 4) deployment, while the respective peak efficiency is 4 bits/s/Hz. This is shown in a 4G Americas white paper entitled "MIMO Transmission Schemes for LTE and HSPA networks", June 2009, FIG. 22, page 40. Even in the most advanced multiple-antenna LTE deployment with four antennas on the mobile, the spectrum efficiency is only 2.5 bits/s/Hz (see same 4G Americas white paper), while the theoretical peak efficiency for this system is 16 bits/s/Hz. In reality, very few mobiles will have four antennas and the actual average spectrum efficiency for a typical 4G cell will be below 2 bit/s/Hz.

Increasing Spectrum Efficiency with MIMO Systems

A well-known approach for addressing the low spectrum efficiency problem in wireless communications is using a small number of multiple antennas. One popular application is the spatial diversity MIMO (Multiple Input Multiple Output) system, which takes advantage of signal scattering to reuse the RF spectrum for multi parallel transmissions. A 4×4 MIMO as supported by LTE has four antennas at the base station and four antennas at the mobile, and in ideal conditions, it transmits four times the data on the same RF spectrum as compared to a conventional non-MIMO system (four times increase in maximum spectrum efficiency).

Figure 6:
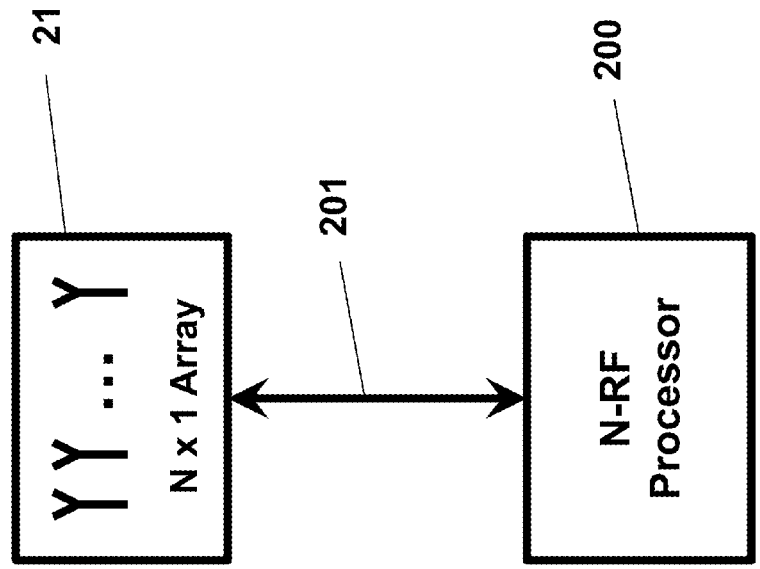
FIG. 6 depicts a diagram of a base station system with one-dimensional antenna array.

A diagram of a base station system suitable for MIMO operation is shown in FIG. 6. This system comprises a one-dimensional antenna array 21 with N antennas, a signal processing subsystem 200 called N-RF processor, and an interconnect network 201 called N-RF full-duplex interconnect, passing signals back and forth between the N antennas of the antenna array and the N-RF processor. In addition to standard functionality as in the one-RF processor of FIG. 4, the N-RF processor includes N−1 additional RF circuits (radios) and respective interfaces and a complex digital processing capability called "channel matrix processing", which performs the necessary real-time calculations for MIMO operation. In effect, channel matrix processing uses the spatial diversity of RF signal propagation to separate from each other N individual RF signals transmitted over the same RF spectrum. A special form of MIMO, is when the wireless client has a single antenna. In this case, the RF spectrum is not reused by multiple parallel transmissions but rather the SNIR from a single transmission is boosted by appropriately combining signals propagating through multiple paths.

Figure 7:
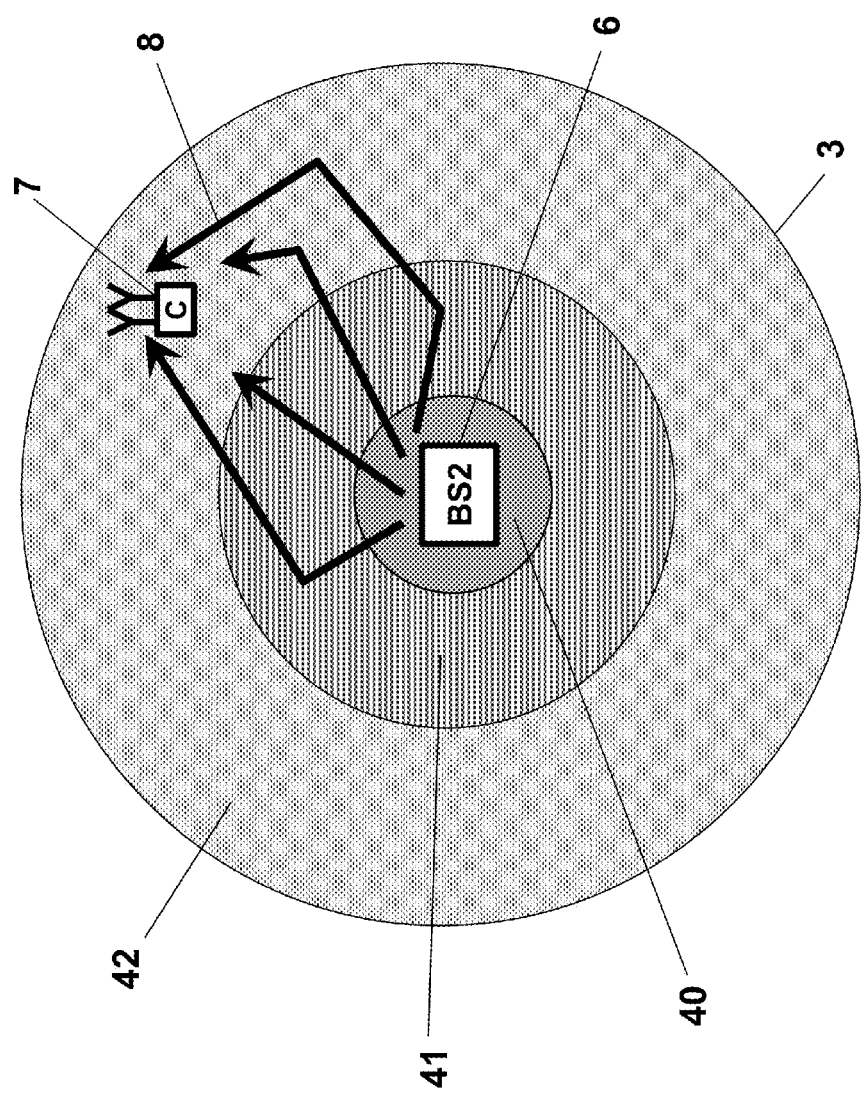
FIG. 7 depicts a simplified diagram of 2×2 MIMO operation.

The spatial diversity MIMO concept is illustrated conceptually in FIG. 7 for the case N=2 (two antennas at base station system and two antennas at the wireless client). The base station 6 transmits two independent signals over the same spectrum with two antennas (one antenna per signal). Due to the differences in the physical positions of the base station antennas (e.g. spatial diversity), each signal propagates through different paths to reach the wireless client 7. The latter receives the two signals with its own two antennas physically placed at different positions. Therefore, each wireless client antenna receives a superposition of two base station signals, each such signal having propagated through a unique physical channel represented graphically in FIG. 7 as a wireless path. Wireless signal path 8 is one of the four wireless signal paths. The 2×2 MIMO has four channel parameters (first base station antenna to first client antenna, first base station antenna to second client antenna, second base station antenna to first client antenna, and second base station antenna to second client antenna). Assuming certain conditions of scattering in signal propagation, the wireless client can separate through computations the two signals transmitted from the base station.

The spatial diversity MIMO system has the fundamental drawback that mobiles require multiple antennas, which is difficult to implement in cell phones. Furthermore, the mobiles have multiple power hungry RF circuits (radios) and substantial digital processing requirements for MIMO computations, shortening the battery-operated time. In addition, MIMO processing for peak rates requires large signals with respect to the channel noise. When mobiles are not too close to the base station, the possible MIMO rates and MIMO spectrum-efficiency drop dramatically. The LTE example discussed earlier shows that not only a 4× increase in number of antennas (from one antenna to four antennas) results in less than 2× increase in average spectrum efficiency, but the ratio between the average efficiency to peak efficiency for 4×4 MIMO is much lower than for a conventional non-MIMO system.

Increasing Spectrum Efficiency with Traditional Beam Forming & Steering Systems

A different application of multiple antennas is in traditional beam forming/steering systems. One benefit of this approach is that the mobiles are standard as used in conventional wireless systems and only the base station has multiple antennas and RF circuits (radios). On the base station side, traditional beam forming/steering is similar to MIMO, requiring multiple RF circuits (number of radios equals number of antennas) and employing heavy signals processing called "beam processing". The diagram of the base station system illustrated in FIG. 6 also applies to traditional beam forming/steering systems. However, beam processing is different from channel matrix processing. In beam processing, RF signals from/to N antennas are combined such as to add constructively desired signals and cancel undesired signals (interferers).

Figure 8:
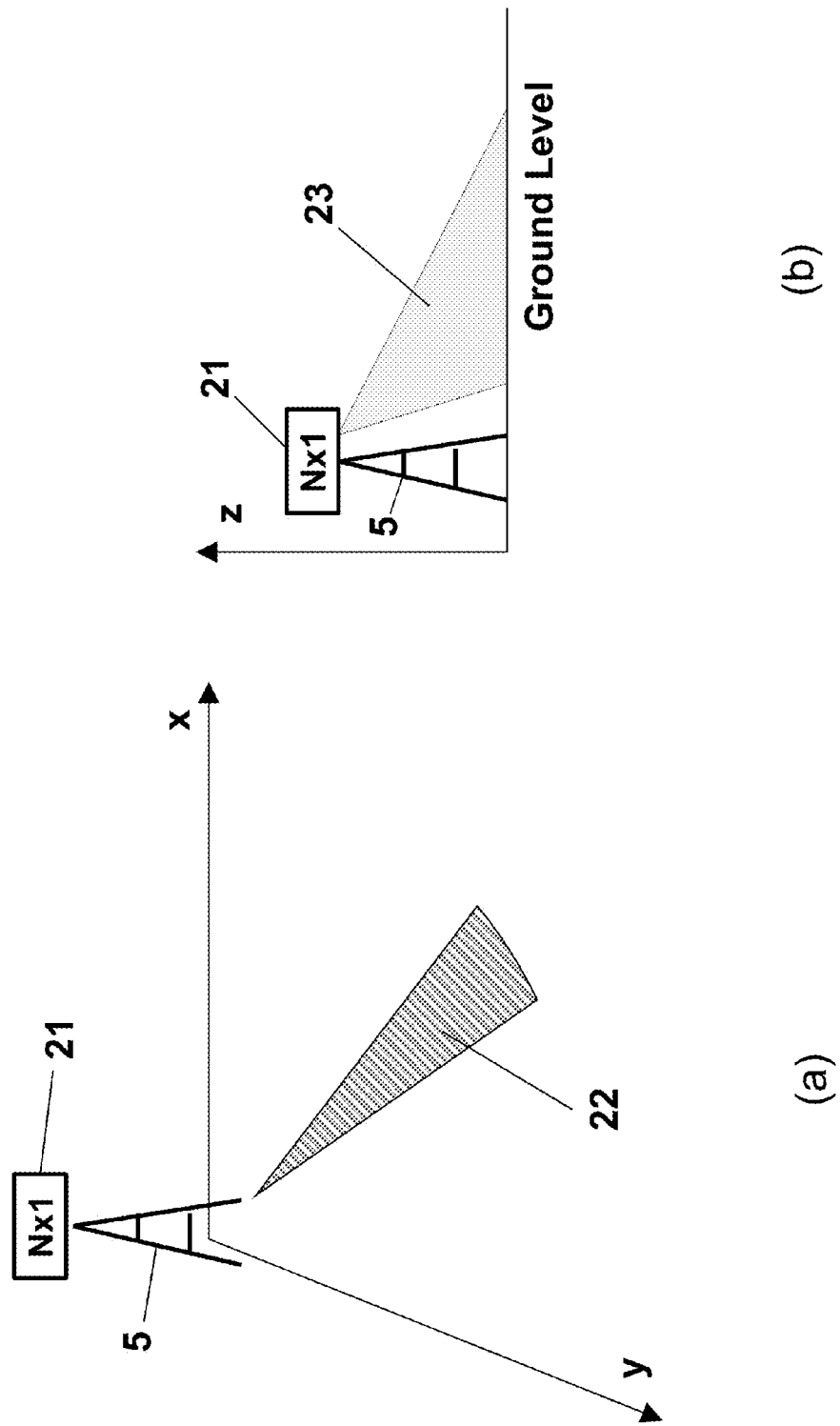
FIG. 8 depicts a diagram of radiation pattern for traditional beam forming/steering system: (a) sector coverage in the horizontal "x-y" plane, (b) radiation pattern in the vertical "z-ground" plane.

FIGS. 8(a) and 8(b) show an effective radiation pattern of a traditional beam forming/steering system using antenna array 21. On the horizontal plane, radiation ground coverage 22 is a narrow section of the sector called a fan beam. On the vertical plane, the radiation is the same as in conventional sector antennas. A vertical section 23 in FIG. 8(b) is the same as the vertical section 13 in FIG. 3(b). The use of term "effective radiation" above addresses the fact that the fan beam is actual only in the transmit mode and it is virtual in the receive mode. This is explained next.

In transmit mode, the N antennas in the antenna array 21 of FIG. 8(a) transmit N separate but coherent RF signals, which are separate RF versions of the same baseband signal containing the information to be transmitted. In general, each RF version has a different RF phase and a different RF magnitude from the others. As each antenna in the antenna array 21 is a conventional sector antenna, the N RF signals are transmitted over the entire sector but they interfere coherently with each other. This coherent interference occurs by design because all RF signals originate from the same source and the traditional beam forming/steering system is specially designed and calibrated for this coherent operation. The net result is that the N transmitted RF signals interfere constructively within the coverage area 22 and destructively in the rest of the sector. Therefore, in transmit mode, the traditional beam forming/steering system creates actual narrow fan beams.

In receive mode, the N antennas in the antenna array 21 of FIG. 8(a) receive N separate RF signals, representing N versions of the sector signals (from mobiles and interferers), each version received at a different spatial position. The traditional beam forming/steering system digitizes each signal separately and combines them coherently in the digital domain to effectively create the coverage area 22 and zero coverage elsewhere in the sector. Therefore, in receive mode, the traditional beam forming/steering system creates only virtual narrow fan beams.

A potential issue for any beam forming system creating large signals holes across the sector (no signal outside the beams) is mobile tracking. As mobiles move out of a covered area, the wireless link would apparently break. An important feature of the traditional beam forming/steering system is its capability to monitor the entire sector at all times despite the fact that the radiation patterns are effectively narrow. This is because the received beams are virtual through computations and not real. The system has full information about all mobiles in the sector at all times (N versions of this information). This information is used to track the wireless clients as they move through the cell and to point the beams (or nulls—see later) dynamically towards the targeted wireless clients.

Figure 9:
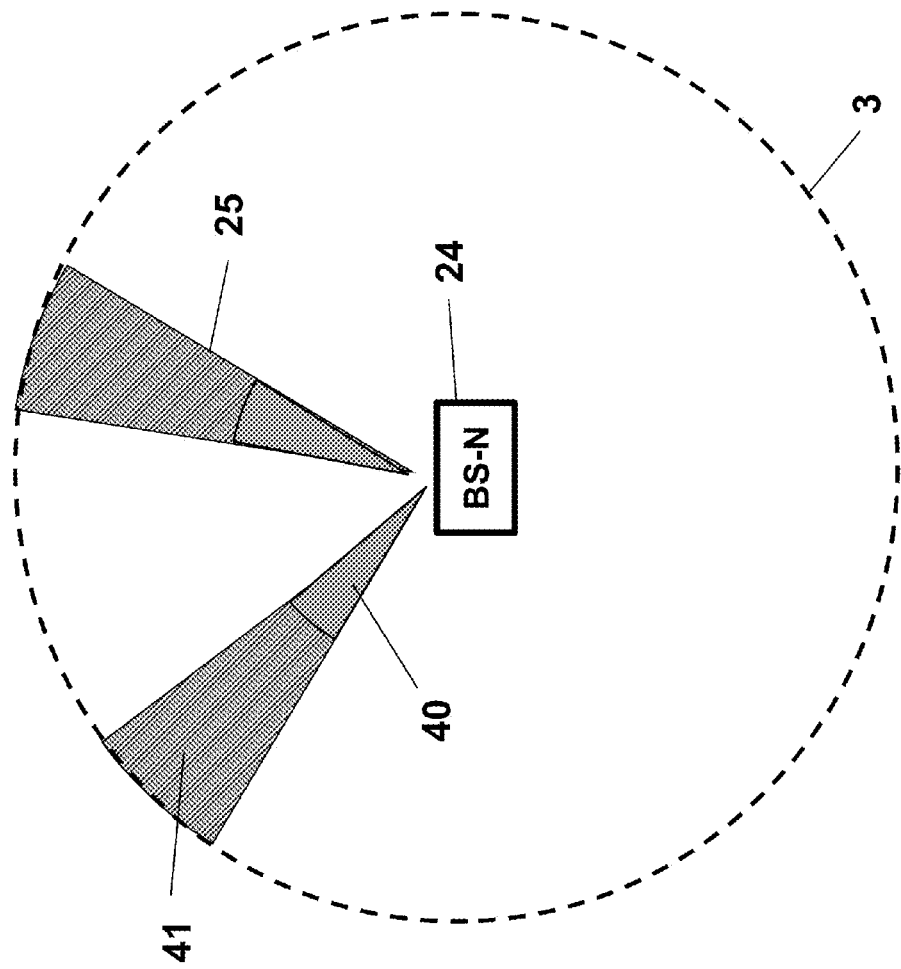
FIG. 9 depicts a simplified diagram of signal strength distribution within a wireless cell for traditional beam forming/steering system.

FIG. 9 shows a cell serviced by an ideal traditional beam forming/steering system 24, which enhances the signals from/to mobiles inside several narrow fan beams such as 25 and removes the signals from/to mobiles outside these fan beans. Effectively, the base station 24 with beam forming/steering boosts the SNIR within the beam areas compared to the conventional base station 1 of FIG. 5.

The method for wireless coverage in FIG. 9 is fundamentally different from that of FIG. 5. The former contains multiple (two in this case) fan beams, covering only a portion of the sector at a time. This concentration of antenna radiation is responsible for increasing the SNIR of the RF signals within the beams by two means. First, the signal portion of SNIR is increased with respect to the noise and interferer levels. Second, the probability for multipath fading decreases because the RF signals propagate only in a portion of the cell. This tradeoff between improved SNIR within the beams and zero SNIR outside the beams requires coordination with the wireless communication process. For this reason, the system points the beams towards the targeted wireless clients.

Fan beans as in FIG. 9 are naturally created with one-dimensional antenna arrays, in which N regular sector antennas are positioned next to each other. Appropriately phasing the RF signals of each antenna is sufficient to generate fan beams with small side lobes, which can be further reduced by varying the magnitudes of the antenna signals. The larger the number of antennas the narrower the beams in azimuth spread. However, the beam shape is always elongated, spanning the sector in radial direction from the base station antennas to the end of the sector. Other radiation patterns, such as placing notches at various azimuth angles to reduce interferers are extremely useful and possible through similar phase and magnitude variations of the N antenna signals. However, it is emphasized that having a one-dimensional array as described (any number of antennas) may not be sufficient to shape the beams in the radial direction. One dimensional antenna arrays cannot generate spot beams, also known as pencil beams. In other words, the patterns generated by one-dimensional antenna arrays are invariant in the radial direction.

Despite attractive theoretical attributes such as increased spectral efficiency, conventional beam forming/steering systems suffer from important practical limitations. A key limitation for wireless cellular systems is the difficulty to scale the system beyond a small number of antennas (there are rarely more than eight antennas). In addition, the cost of the hardware becomes excessive (too many high-quality radios), and the complexity of the necessary baseband processing becomes too high, requiring expensive digital processors and software. Using only a few antennas limits the maximum antenna gain in any direction and the spatial filtering effect of the system. For this reason, in practice, rather than using fan beams as ideally illustrated in FIG. 9, the removal of co-channel interferers (signals within the same RF spectrum) is usually preferred by placing nulls/notches in the directions of the interferes. As each mobile signal communicates with the base station on different multi paths, the processing of real life wireless traffic, including tracking mobiles, is complex. In practice, an eight-antenna beam steering system attains less than a factor-of-two increase in spectrum efficiency, which represents a mediocre performance-to-cost ratio.

The previous discussions show that existing methods for increasing the spectrum efficiency, using a small number of antennas and digital signal processing exclusively, have limited effectiveness. For example, the LTE standard allows 16 bits/s/Hz peak spectrum efficiency yet the average efficiency is expected to be less than 2 bits/s/Hz even with the most sophisticated processing available.

A way to go beyond these performance limitations, according to one aspect of the present disclosure, is to introduce new hardware capabilities in the RF front end of the base station system to boost the signal SNIR before digitization. This allows additional possibilities for processing algorithms to optimize the average spectrum-efficiency. Of course, the enhanced system should also be economical.

Increasing Spectrum Efficiency with Large Antenna Arrays

Figure 10:
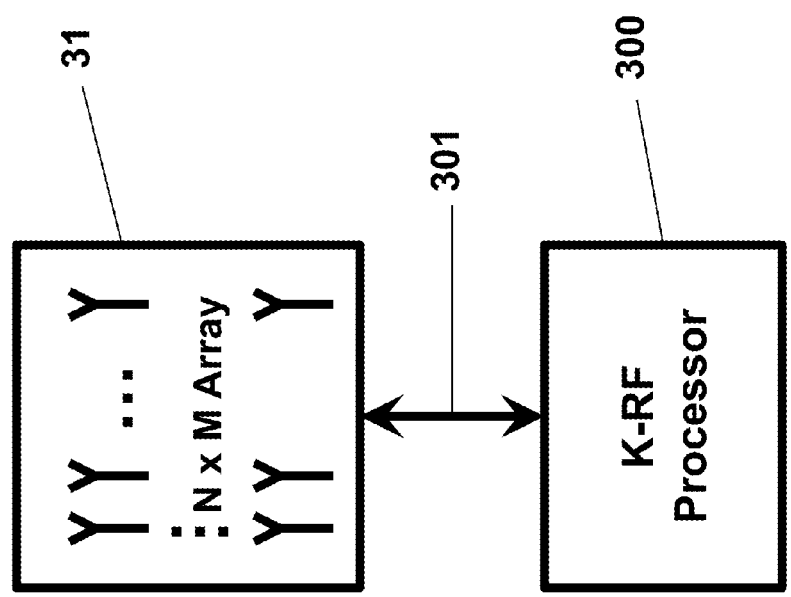
FIG. 10 depicts a diagram of a base station system with two-dimensional antenna array in accordance with one embodiment of the present disclosure.

The use of large antenna arrays in commercial wireless systems has not been possible due to the high cost of such systems, as discussed above. However, theoretically, the concept of beam forming/steering discussed above benefits greatly from an increased number of antennas. The potential respective base station system, which is a generalization of the system in FIG. 6, is illustrated in FIG. 10. Antenna array 31 is two-dimensional of N×M size. These N×M antennas transmit and receive N×M separate RF signals. As a further generalization of the system of FIG. 6, the N×M RF signals may be combined in any specific way to generate K RF signals, which are transmitted through a full-duplex interconnect network 301 called a K-RF full-duplex interface. An RF/analog/digital signal processor 300 called a K-RF processor processes the K RF signals to obtain improved average spectrum efficiency over the sector/cell. The details of this K-RF processor function will be described in more detail below.

The addition of a second dimension in the antenna array creates a new fundamental capability, which is the possibility of shaping the overall radiation in the radial direction as well as in azimuth. As a result, this system can create pencil beams. FIGS. 11(a) and 11(b) show the radiation pattern of such a system using the two-dimensional antenna array 31. On the horizontal plane, radiation ground coverage 32 is a round signal area surrounded by a zero signal area. On the vertical plane, radiation is narrow, as shown by section 33 in FIG. 11(b). Entire pencil beam 34 is illustrated in FIG. 11(a).

Figure 12:
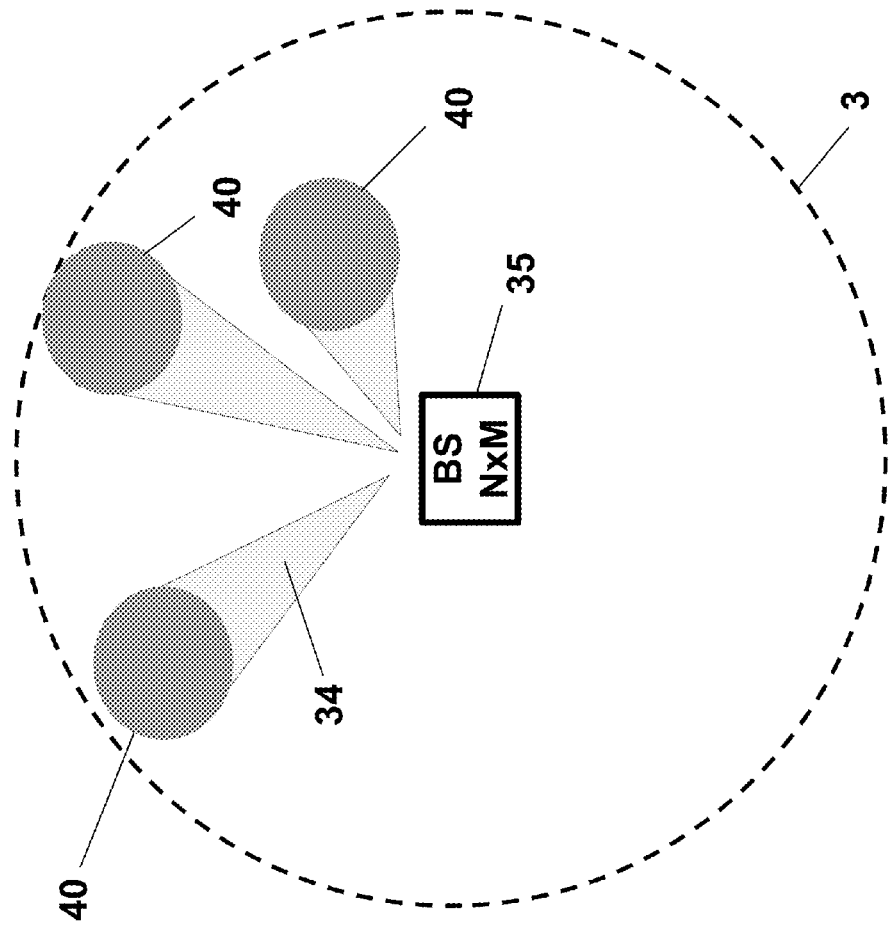
FIG. 12 depicts a simplified diagram of signal strength distribution within a wireless cell for a system with pencil beams in accordance with one aspect of the present disclosure.

FIG. 12 shows a wireless cell serviced by a base station 35, which uses a two dimensional antenna array and pencil beams, according to one aspect of the present disclosure. The base station 35 enhances the signals from/to mobiles inside three strong-signal areas covered by three pencil beams such as pencil beam 34, and removes signals from/to mobiles outside these strong-signal areas. Effectively, the base station 35 with pencil beams boosts the SNIR within the beam areas not only compared to the base station 1 of FIG. 5 but also compared to the base station 24 of FIG. 9. It is important to mention that, theoretically, the pencil beams such as pencil beam 34 can be placed and moved electronically to any position in the sector by changing the N×M RF signal phases and magnitudes.

Figure 11:
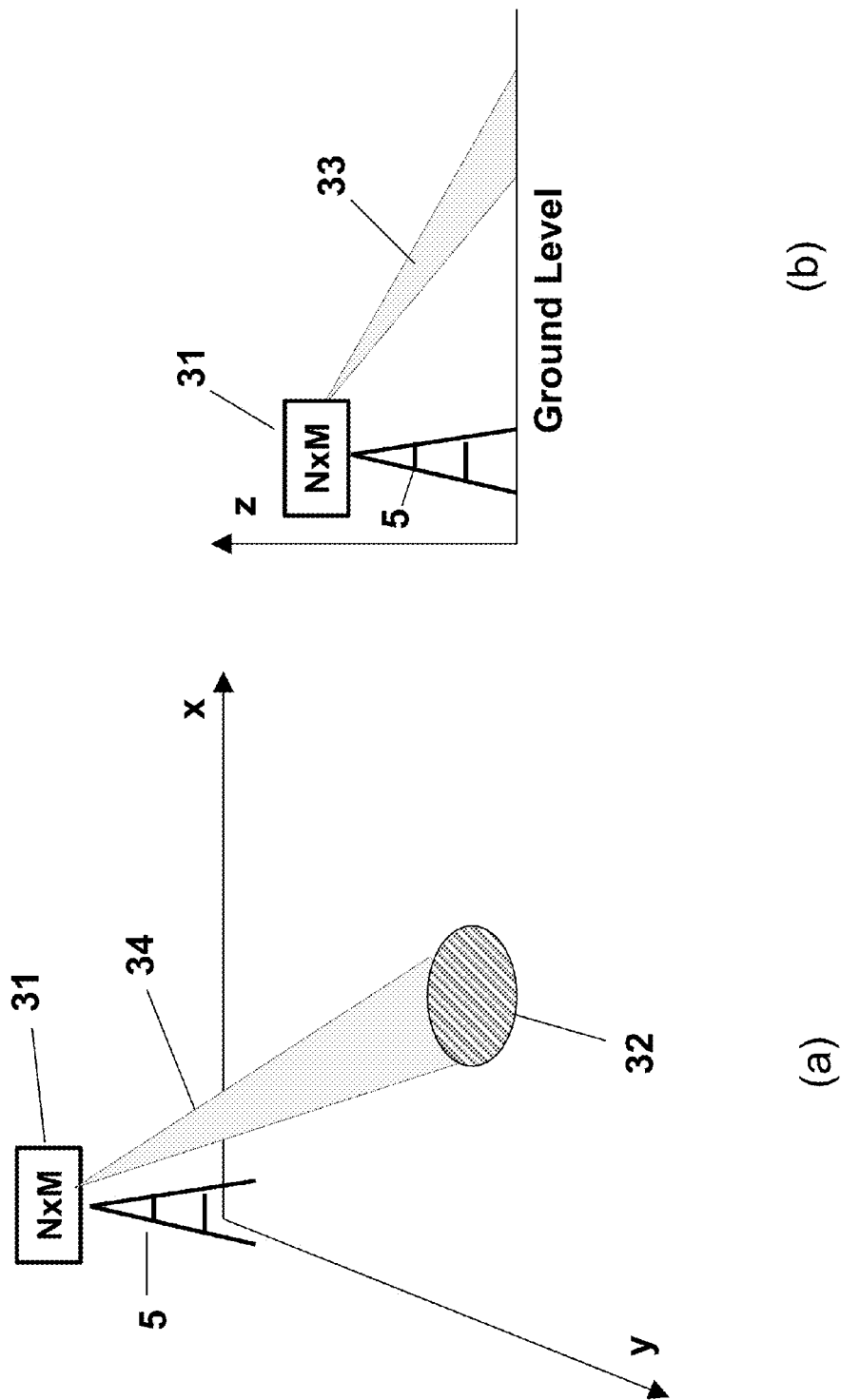
FIG. 11 depicts a diagram of radiation pattern for system with pencil beams in accordance with one aspect of the present disclosure: (a) sector coverage in the horizontal "x-y" plane, (b) radiation pattern in the vertical "z-ground" plane.
Figure 13:
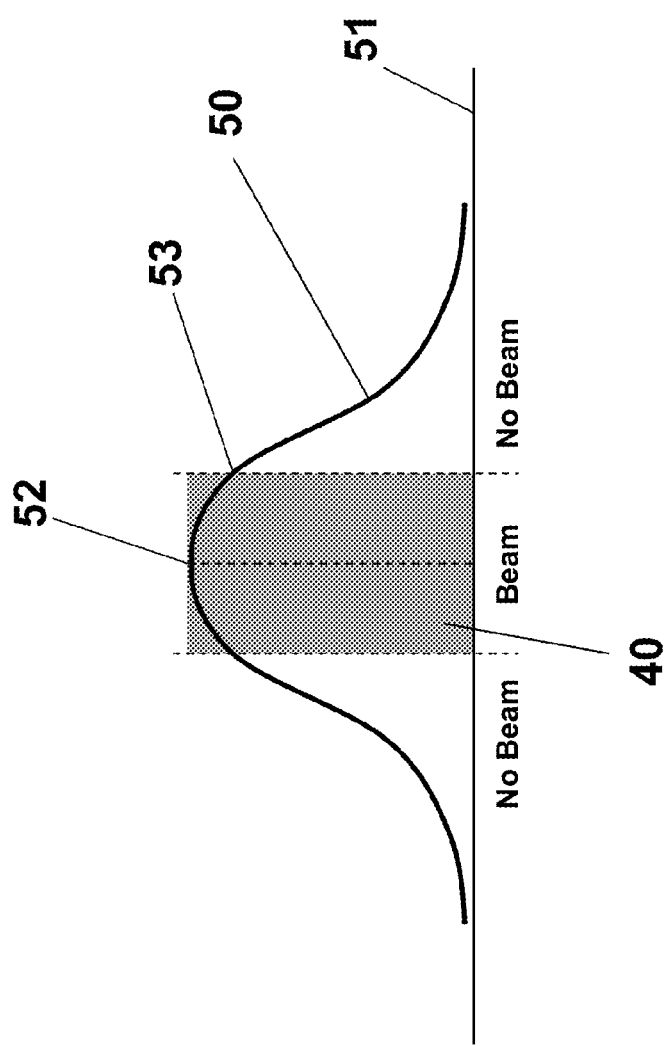
FIG. 13 depicts a diagram of the RF signal power density in a pencil beam along a line in the sector passing through the maximum power density point in accordance with one aspect of the present disclosure.

FIGS. 11 and 12 show beams defined sharply (e.g., RF signal magnitude changing abruptly from a finite value to zero over a beam edge line). This is just a simple graphical representation of the real case illustrated in FIG. 13. In practice, RF power density 50 within a beam changes continuously without discontinuities. Naturally, there is a point 52 in the sector where the RF power density is at maximum. Moving away from that point in any direction on a straight line, the RF power density decreases until it becomes half the maximum value at a point 53, representing a 3 dB variation from the peak value. This point 53 is where the beam edge may be defined, arbitrarily, in accordance with the present disclosure. Outside this area, the beam power density decays to zero at point 51 according to the spatial filtering design used. The larger the antenna array size the steeper the transition region of the spatial filter that can be realized.

Therefore, by convention and without any loss of generality, the beam cover regions as described herein (e.g., strong-signal area 40) are considered inside the −3 dB power density edge line. In addition, beam width is defined as the viewing angle from the point of beam origination (i.e. the center of the antenna array). For example, a "15° beam" may be the area surrounding the peak power density point with power density no lower than 3 dB from that point, this area having a 15° viewing angle from the center of antenna array.

Since the pencil beams are narrow in both azimuth and radial directions, they can reuse the RF spectrum naturally, a key capability for increasing the spectrum efficiency of the wireless network. In other words, pencil beams placed sufficiently far from each other in the sector can safely use the same RF spectrum (little or no beam-to-beam interference) to transmit information in independent parallel streams. Theoretically, the narrower the beams the more beams could be used for parallel transmission over the same RF spectrum and the larger the spectrum efficiency achieved. However, the number of parallel transmissions of independent signals is limited to K, the size of the K-RF full-duplex interface 301 from FIG. 10. In general, the signals traveling through this interconnect network are linear combinations of the beam signals. An important particular case is the situation when there are K beams and each channel in the K-RF full-duplex interface carries the signal of a single beam.

The size of parameter K and the hardware methods of the system of FIG. 10 play key roles in the cost of the system. This is discussed in more detail below.

Using Phased Arrays

The RF/Analog section of the base station system of FIG. 10, is a critical subsystem comprising the N×M Array 31, the K-RF full duplex interface 301, and the radio circuits in the K-RF processor 300. In practice, this RF/Analog section can be implemented with phased arrays. There are many types of such devices: analog arrays, digital arrays, a full range of hybrid solutions, and novel arrays in research and development phases.

As a first example, if K=1 (single radio system), the RF/Analog section of the system in FIG. 10 is a conventional analog phased array where all antenna signals are combined into a single RF signal using a corporate feed (for example, see R. Mailloux, "Phased Array Antenna Handbook," 2nd edition, Artech House, 2005). Currently, these conventional analog phased arrays are very expensive for application in commercial wireless systems such as cellular.

As a second example, if K=N×M (N×M radio system), the RF/Analog section of the system in FIG. 10 is a modern digital phased array, where each antenna signal is generated or processed independently in the digital domain. Like analog arrays, these versatile systems usually used in military radars, are also very expensive for commercial wireless systems. Classical hybrid solutions using partial analog and partial digital phased arrays are expensive, likewise.

Figure 14:
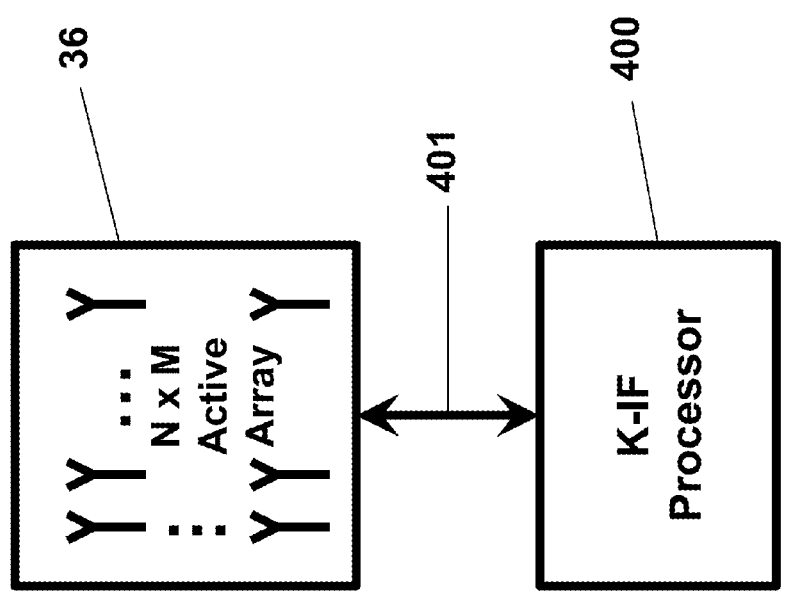
FIG. 14 depicts a diagram of a base station system with two-dimensional phased array in accordance with one embodiment of the present disclosure.

A substantially lower cost phased array solution for the RF/Analog section of a base station system with pencil beam capabilities has been disclosed in U.S. patent application Ser. No. 13/173,300, which is fully incorporated herein by reference. This phased array uses a small K parameter (e.g. K=2-8) and Intermediate Frequency (IF) interfaces. A pencil-beam-capable system using such a phased array solution is illustrated in FIG. 14. The phased array 36 is two-dimensional of N×M size and may be conformal (e.g. non planar). K IF signals are transmitted though a full duplex interconnect network 401 called a K-IF full-duplex interface to/from an IF/analog/digital signal processor 400 called a K-IF processor. The cost breakthrough in this phased array solution comes from the use of silicon integrated circuits and low cost assembly enabled by an RF synchronization method such as described in U.S. patent application Ser. No. 13/173,300. Because of the hardware methods used, this phased array is also extremely agile in beam forming and steering capabilities (i.e. it can switch very fast from one beam configuration to another). In practice, this beam switching speed can be regarded as instantaneous with respect to the speed of information flow as represented by the data rates transmitted. Of course, other more conventional approaches to beam steering can be employed but usually with a penalty of increased complexity and cost and possibly lower agility.

The Agile Beams Technique

The base station system of FIG. 10 and that of FIG. 14 have the fundamental capability of generating multiple pencil beams, which theoretically enable the opportunity to increase the spectrum efficiency, as discussed above. However, additional considerations are necessary for practical realization. The main goal of these considerations is to disclose system-operating techniques for optimum sector coverage and optimum wireless client connectivity. A novel operating technique, called an agile beams technique, is introduced herein. The agile beams technique is valid equally for transmit and receive. Therefore, there is no need to discuss each case separately and all considerations below are for either case.

The base station system of FIG. 10 or that of FIG. 14 can support no more than K parallel independent data transfers with mobile clients. Assuming a small value for K, which is consistent with the low cost phased array solution mentioned above, and the use of K narrow pencil beams, it is clear that a large portion of the sector remains outside the beams. The agile beams technique mitigates this shortcoming.

In the example discussed below, consider having four 15° beams (K=4) in use at one time, but only as an example and without any loss of generality. It will become obvious that the techniques disclosed are valid for many other numbers of beams or beam widths. These techniques are valid even if the beams are not pencil beams, in general.

Figure 15:
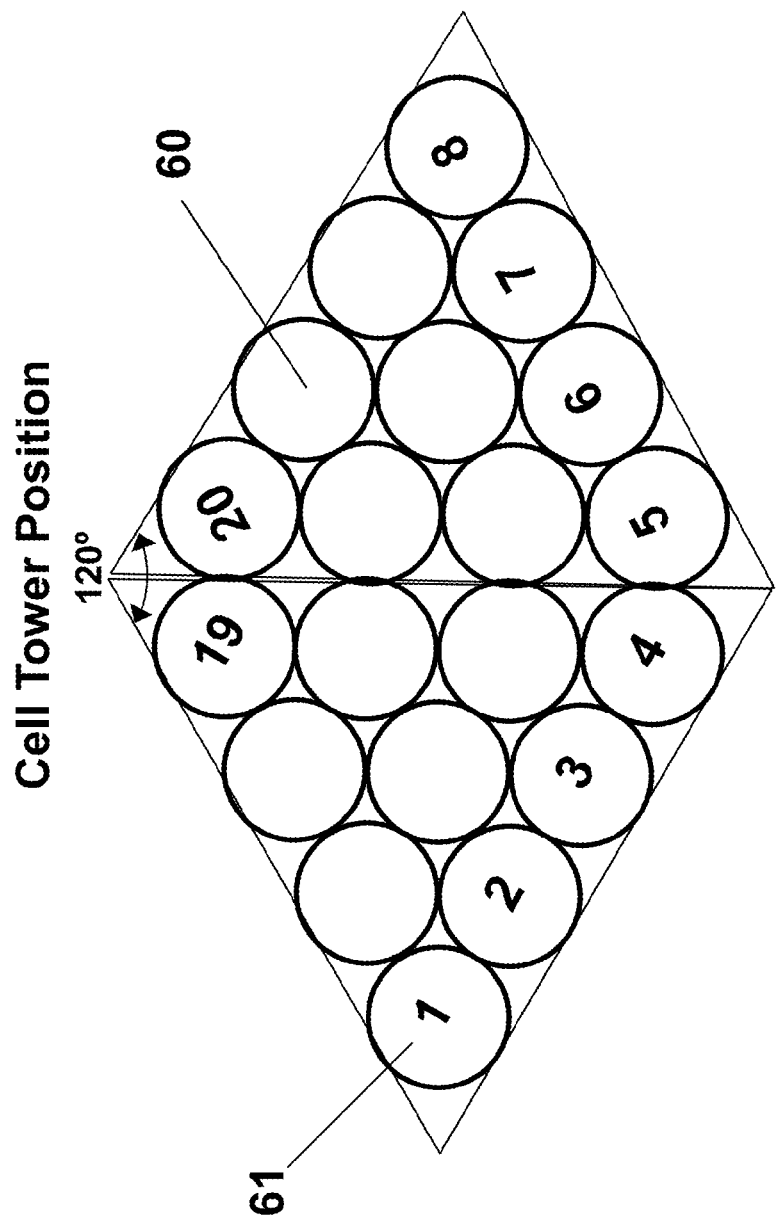
FIG. 15 depicts a 120° sector approximation by twenty circles.

FIG. 15 shows geometrically that a 120° cellular sector can be approximated by two adjacent equilateral triangles enclosing twenty equal circular areas to be called "circles" for simplicity. Circular area 60 is one of the twenty circles. Peripheral circles such as circle 61 have about a 15° viewing angle from the cell tower position (60° angle of the equilateral triangle divided by 4 peripheral circles per triangle is 15°). By convention and for simplicity, any of the twenty circles may be considered as the intersection with the ground plane of a 15° beam originating at the cell tower. This ignores beam-broadening effects near the tower, tower-height effects, and beam-tilting effects. However, these details are not intended to be limiting. In principle, the systems in FIG. 10 or 14 could generate pencil beams of variable sizes to cover any of the twenty circles in FIG. 15 exactly as shown. In addition, FIG. 15 assumes line of sight (LOS) propagation for all beams. Later, we will remove this ideal condition with no fundamental consequences to the system feasibility and performance.

Figure 16:
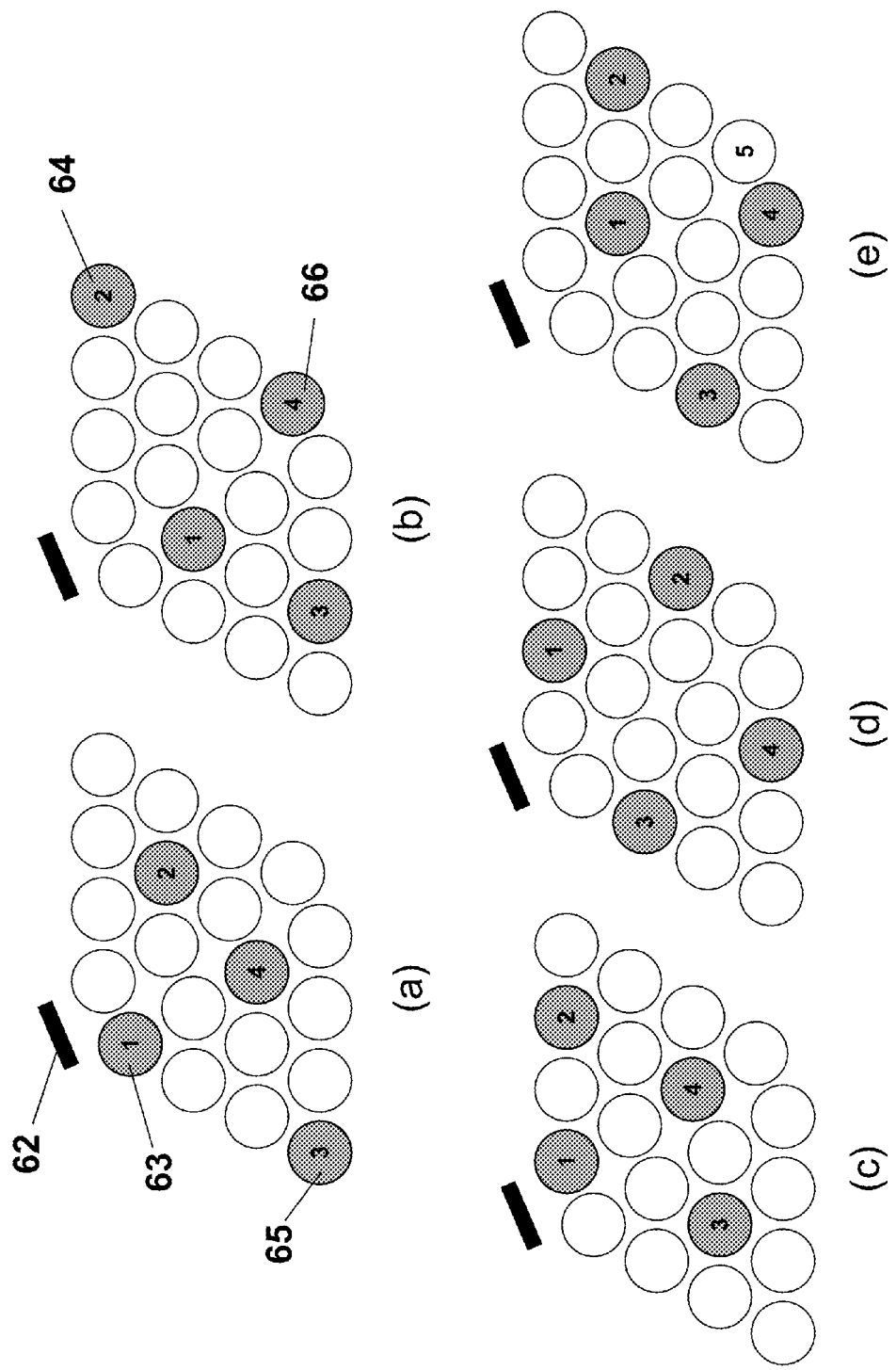
FIG. 16 depicts five possible beam patterns with four pencil beams in accordance with one aspect of the present disclosure: (a) first beam pattern, (b) second beam pattern, (c) third beam pattern, (d) forth beam pattern, (e) fifth beam pattern.

Using four 15° pencil beams covers approximately one fifth of the sector area (four of twenty circles). In order to extend coverage to the entire sector, multiple beam sets are necessary. The diagrams in FIG. 16 demonstrate that such coverage is possible with minimum or no beam-to-beam interference. There are five sets of circles approximating the sector as shown in FIG. 15, shown in FIGS. 16(a)-(e), respectively. Each set of circles corresponds to a different configuration of four pencil beams covering four respective areas with strong signals. For example, in FIG. 16(a), the first beam generated by the antenna array 62 provides area 63 with strong signals and the third beam provides area 65 with strong signals. Similarly, FIG. 16(b) shows that second and fourth beams provide areas 64 and 66 with strong signals, respectively. Each configuration of four beams covering four respective areas with strong signals is called a beam group.

Each set of four circles in FIGS. 16(a)-(e) with strong signals is called a beam pattern. The ensemble of five beam patterns covers the entire sector and each beam pattern contains four strong signal areas covered by four 15° pencil beams in a beam group. Therefore, in FIGS. 16(a)-(e) there are five beam patterns generated by five corresponding beam groups: Group 1, Group 2, Group 3, Group 4, Group 5. The beams in each beam group are positioned far enough from each other not to interfere with each other. Other similar ensembles of pencil beam patterns (generated by respective beam groups) with the same properties are possible. It is also possible to create such ensembles of patterns with beams, which are not pencil beams but rather elongated beams, star shaped beams, etc.

Using the five beam patterns in FIG. 16 as an example, one way to cover the entire sector is to switch the beam patterns on and off such that only one beam pattern is on at a time and all beam patterns are on some times. Attaining maximum spectrum efficiency requires that there are no times without a beam pattern on. In other words, for maximum spectral efficiency, information should be flowing between the base station and the wireless clients at all times.

In order to obtain a viable wireless communication system, the transfer of information between the base station and the wireless clients must be coordinated with the process of beam pattern switching. This combination of beam pattern switching and coordinated information transfer is called the agile beams technique. The word "agile" refers to the implied requirement that beam patterns switch very fast compared to the information transfer rates to avoid any loss of information during beam switching.

The coordinated scheduling strategy of the agile beams technique is fundamentally different from the processing strategies in conventional beam steering technology. As explained above, in a conventional beam steering case, the system has full knowledge of the entire sector at all times and creates "beam" configurations with maximums in some directions (clients served) and nulls in others (interference cancellation). This strategy can be described as "base station following the mobiles". In the agile beams technique, there is no following of mobiles with beams but rather the mobiles are scheduled/programmed to communicate with the base station according to a process of sector coverage with agile beams generated by the base station. Therefore, this strategy can be described as "mobiles following the base station".

Examples of Agile Beams Systems

In the most general case, the agile beams technique could be used with irregular and dynamic switching of beam patterns and with changing beam patterns (in number of beams and size of beams). For example, if a certain area of the sector has no wireless clients for a period, the respective beams covering that area could be left off in favor of turning on other beams patterns. Likewise, for very heavy wireless traffic in a certain area, the respective beams could be kept on all the time. In a less general but simpler application of the agile beams technique, the five beam patterns in FIG. 16, or an equivalent, may be repeated indefinitely, with each beam group generating a beam pattern being turned on one fifth of the time. In effect, this simple process is equivalent to scanning the sector with four beams in discrete steps.

Figure 17:
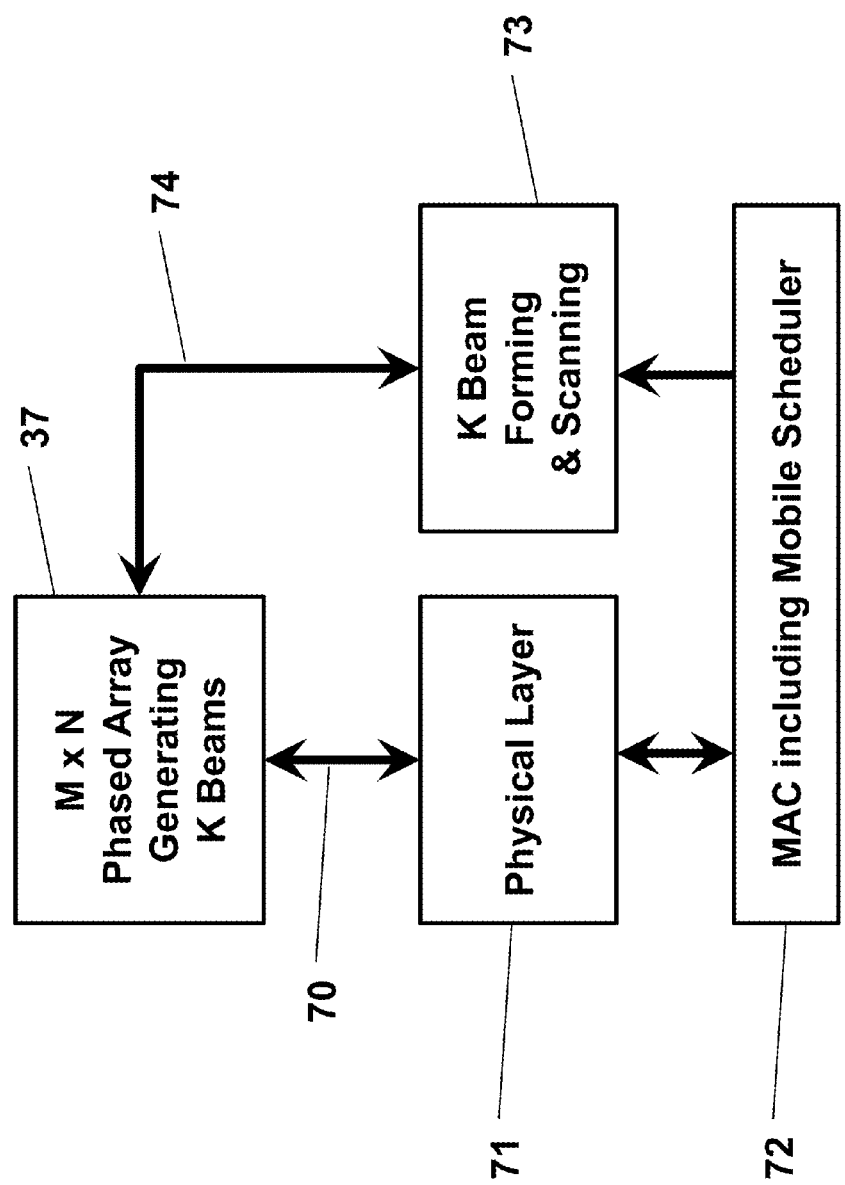
FIG. 17 depicts a diagram of a base station subsystem in accordance with one embodiment of the present disclosure.

The proper coordination between beam pattern switching and information transfer is key to the agile beams technique. FIG. 17 shows a diagram of a possible base station subsystem providing this functionality in the simple case of multi-beam scanning. This subsystem may be included in the base station system of FIG. 10 or that of FIG. 14. The N×M phased array 37 in FIG. 17 generates K agile beams transmitting or receiving K RF signals, which move from/to physical layer processing 71 through signals 70. The phased array beams are programmed through module 73, called a K-Beam forming and scanning module, controlled by the MAC (Media Access Control) software. This module performs a conversion of high-level MAC commands into phase and magnitude numbers used by the phased array to generate the requested beam patterns and into beam switching/scanning programs. Control signals 74 transfer the beam forming information to the phased array.

It is in the MAC layer that the coordination between beam switching/scanning and information transfers takes place. A scheduler 72, a portion of the MAC allocating time/frequency communication resources to wireless clients, schedules receive and transmit times for wireless clients during the time when beams provide coverage to areas where the respective clients are. The physical layer processing block 71 provides the standard operation of translating RF signals from/to digital data to/from modulated analog formats.

It should be understood that the functionality disclosed in FIG. 17 and discussed above might typically be implemented by firmware or by a processing system including one or more processors, memory (e.g. ROM, disk storage, permanent storage, etc.) for storing the appropriate program code for the various functionality, and RAM and/or active memory which is used during execution of the program code, or by a combination of both.

The agile beams technique with four beam patterns as in the examples discussed above fits well the LTE standard. Since the latter allows up to four base station antennas for MIMO, it supports four independent streams of data transmission through the physical layer and interfaces. In addition, LTE MAC layer scheduling is extremely flexible in time and frequency slot allocations, enabling the possibility of coordinated scheduling. Furthermore, the agile beams technique integrates naturally into the data frame structure in LTE resulting in large average spectrum efficiency.

In one embodiment, the scanning scheme described with respect to FIG. 16 may be repeated indefinitely every 5 ms, with each four-beam pattern activated 1 ms at a time. This corresponds with changing the antenna beam pattern (or beam group) every LTE sub-frame (1 ms), focusing the antenna to a different 20% of the sector each sub-frame. During a 10 ms LTE frame, each point in the sector will be covered twice for a total of 2 ms, corresponding to 28 packets with a short cyclic prefix (14 packets per sub-frame) or 24 packets with a long cyclic prefix (12 packets per sub-frame).

For mobiles moving at 250 Km/h (0.7 m position change per LTE frame), there will be at least 280 LTE packets within a 7 m change in position (10 LTE frames, 14 packets per sub-frame, two sub-frames serviced per frame for each beam area). This change in position is relatively small in comparison with the radius of the area covered by each beam. For example, for a small sector of 500 m radius each beam covers a circular area with a 64.5 m radius. For a 5 Km radius sector, each beam covers a circular area with a 645 m radius. Slower moving mobiles may get even better coverage for each predetermined beam position while mobiles at rest may get continuous coverage from a beam position. These simple calculations show the advantage of covering the sector with multiple agile pencil beams: there is a de facto continuity in sector coverage and there are never long periods when the base station is not in contact with the mobiles.

An example was presented above in which the system repeatedly cycles through the beam groups in a sequential manner and in a regular fashion (i.e., the sequence of Group 1, Group 2, Group 3, Group 4, Group 5 continually repeated with each beam group generated for the same amount of time). However, repeatedly cycling through the beam groups can also occur in an irregular or non-periodic manner, depending on the requirements of the situation. For example, different beam groups can be on for different amounts of time, and/or they can be done out of order, and/or some groups can be generated more than one time during a cycle of operation. A more subtle point regarding this issue is discussed below.

Wireless Client Control

In the above description of the agile beams technique there was the tacit assumption that the base station can communicate to wireless clients control information including time scheduling information. This is normally done through special control channels, which typically require substantially lower SNIR than high-speed data channels. A simple way to establish and maintain control channels may be through a separate static 120° beam covering the entire sector. However, this approach may waste one beam and would likely require modifications in the current wireless standards. An alternative approach is discussed below.

Figure 18:
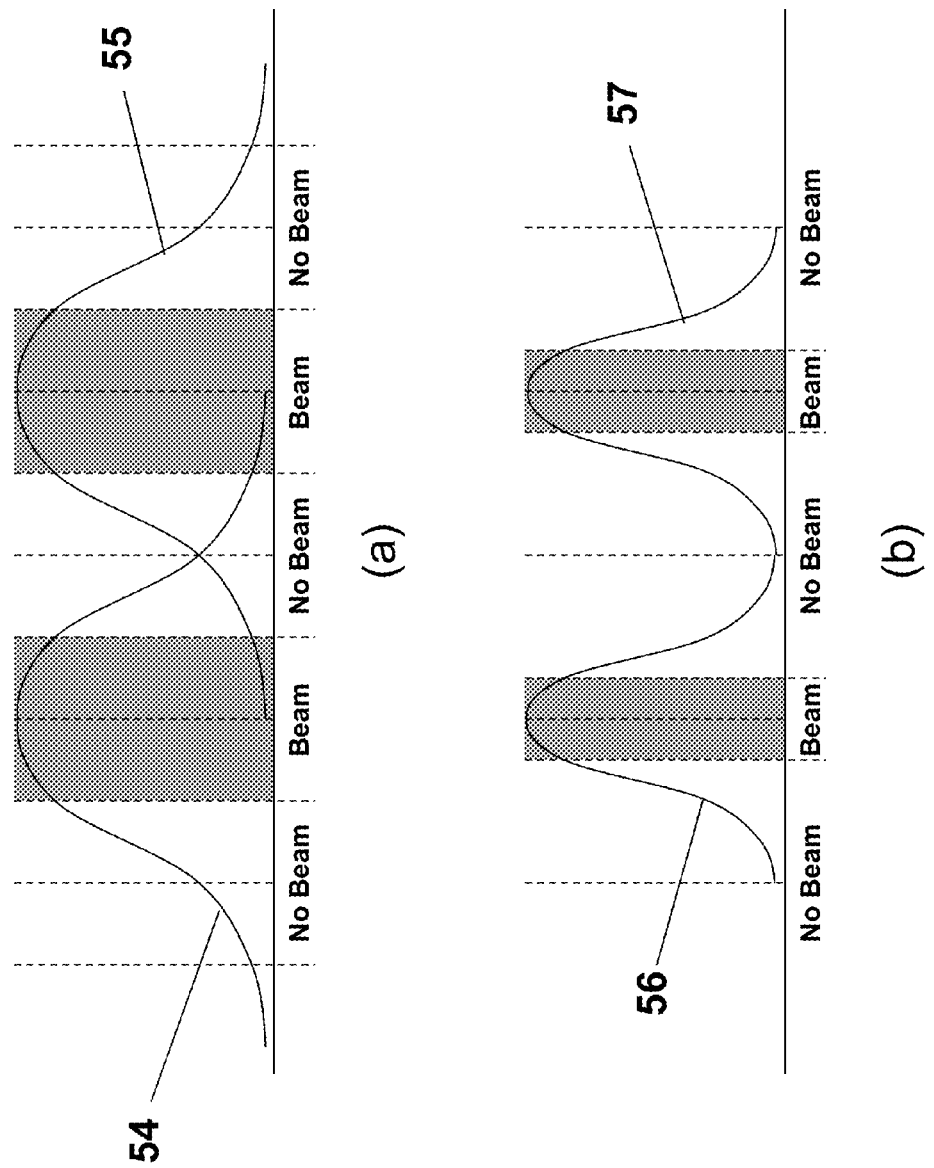
FIG. 18 depicts a simplified diagram of signal strengths along a line in the sector crossing two pencil beams separated by a non-beam region in accordance with one aspect of the present disclosure: (a) the case of proper pencil beams, (b) the case of too narrow pencil beams.
Figure 19:
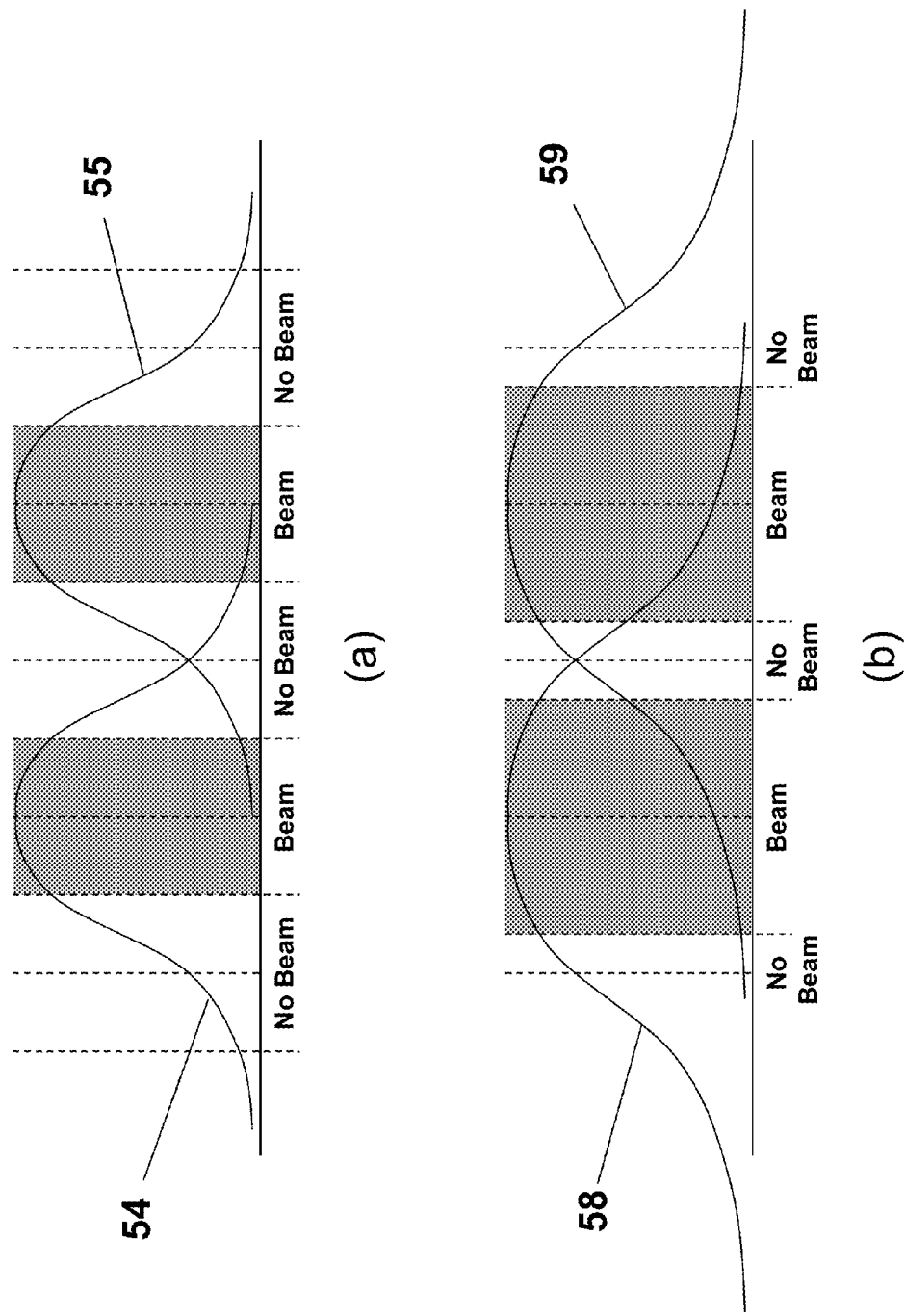
FIG. 19 depicts a simplified diagram of signal strengths along a line in the sector crossing two pencil beams separated by a non-beam region in accordance with one aspect of the present disclosure: (a) the case of proper pencil beams, (b) the case of too wide pencil beams.

The number of beams and beam sizes can be selected as follows: a) the beams should be narrow enough such that at midpoint between beams, the spatial filtering of the antenna reaches stop band; and b) the beam widths should not be so narrow as to leave large portions of the sector uncovered with little antenna radiation. This is possible by choosing the right beam width and number of beams, assuming the system has the capabilities of generating narrow beams (e.g. large enough phased array). FIGS. 18 and 19 illustrate this point. The proper design is shown in FIGS. 18(*a*) and 19(*a*). Here the intensity of a first beam 54 becomes negligible outside of a radius 1.5 beam widths away from the beam center, thus not producing any significant interference to a second beam 55. However, the area between beams is still covered, albeit with lower energy. Since at least two beams cover this area in any direction, the base station maintains a possibility to communicate with mobiles control information at a lower SNIR. In general, the inter-beam areas are intended to be quiet, i.e., mobiles inside those areas are not permitted to send or receive payload data but the base station can still maintain low rate control signaling with the mobiles for network management reasons. This creates a possibility to control the mobiles just as efficiently as in a classical deployment without using the agile beams technique.

The use of narrower than optimum beams as in FIG. 18(*b*) hinders the capability of mobile control because inter-beam areas remain uncovered either by a first beam 56 or by a second beam 57. The use of wider than optimum beams as in FIG. 19(*b*) creates the possibility of inter-beam interference as a first beam 58 and a second beam 59 extend their power distributions into each other.

Non Line of Site (NLOS) Case

In the previous considerations, LOS (Line of Site) wireless connections were assumed for simplicity. In reality, there are very few cases if any, when cellular wireless communications happen exclusively in LOS conditions. The typical situation is that only a few mobiles are in LOS, and most mobiles communicate with the base station through signal reflections on buildings or other manmade structures and on natural obstacles such as trees, large rocks, etc. In addition, many reflections of the same signal often arrive at different times causing multipath interference and fading.

Figure 20:
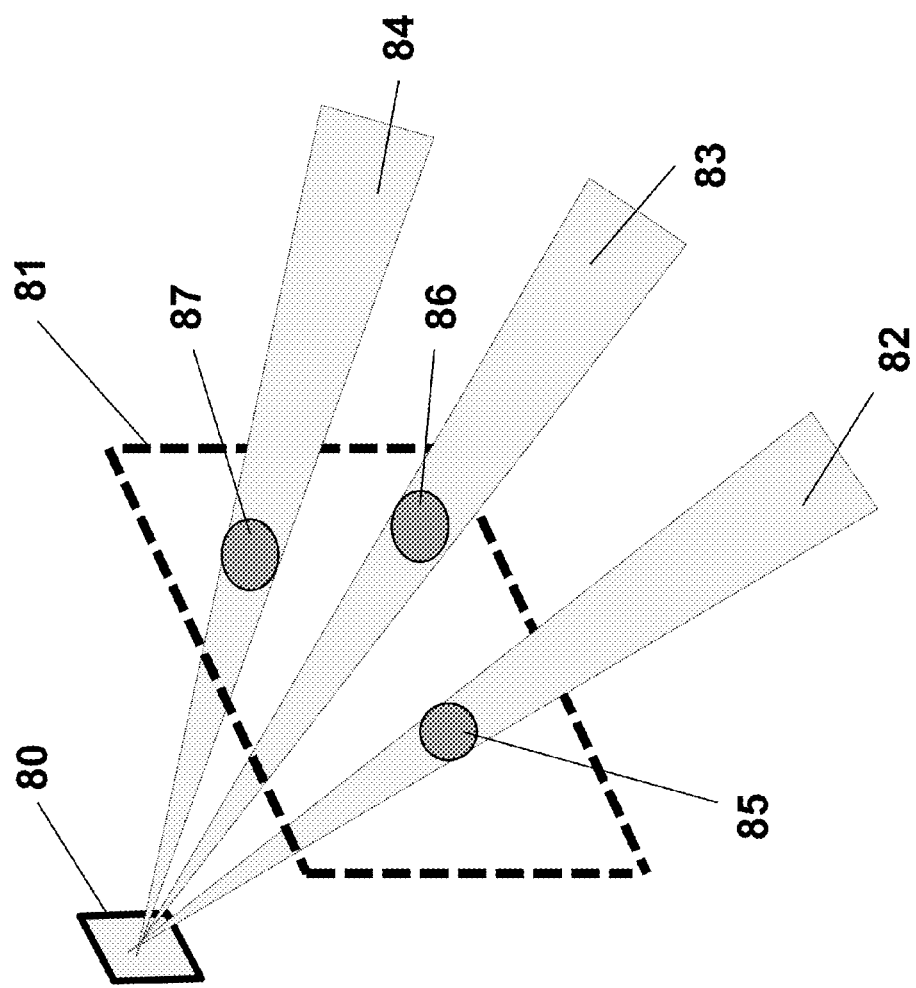
FIG. 20 depicts a diagram of three beams intersecting a finite planar surface in space in accordance with one aspect of the present disclosure.

While LOS and NLOS propagations are important considerations for the overall communication system, from the perspective of the base station antenna, the only thing that matters is its spatial capabilities to source or sink RF energy and not how the incoming or outgoing radiation travels through the sector. Therefore, in general, the patterns of FIG. 16 generated for example by the phased array of FIG. 14 are factual in the very front of the phased array, either for the full LOS case or for the full NLOS case or for any combination thereof. In other words, if one considers a plane parallel with the phased array placed in front of it, the RF sourcing or sinking patterns of the four beams through this plane would be as shown in FIG. 16. This assumes the plane is far enough to avoid near field effects and there are no physical obstacles between the phased array and the plane. An illustration of this theoretical consideration is shown in FIG. 20 for three beams. A finite planar surface 81 is positioned in front of an antenna array 80 and three beams 82, 83, 84 intersect the finite planar surface 81 in three corresponding regions 85, 86, 87, similar to the patterns of FIG. 16.

In the full LOS case as assumed previously, the beam patterns on the finite planar surface map directly into corresponding sector areas via simple geometrical projections (cones), preserving the topological properties, i.e., continuous areas map into continuous areas, etc. In the NLOS case, this mapping could be much more complicated and in general will not preserve topological properties. That is, a continuous circular area on the finite planar surface in front of the antenna may map into several disjoint areas (e.g. mobiles not too close physically may still communicate best with the base station on the same beam). Naturally, the narrower the phased-array beams the more likely to have a simpler sector mapping to the antenna radiation. Below, two NLOS cases are identified for the agile beams technique: a simple case and the general case.

The simple NLOS case is the "one-mobile to one-beam" case. Irrespective of sector mapping to antenna radiation complexities, if for a particular scheduling each mobile communicates with the base station through only one of the three beams, then this NLOS case is essentially the same as the LOS case for the agile beams technique. In other words, if for example the scheduler 72 knows which single beam covers every mobile at all times, the actual physical location of the mobile is irrelevant. Of course, in this case a mobile moving at high speed may traverse a small NLOS covered spot much faster than in the LOS case. However, it is likely this situation would not be much better for any other wireless system with the same tower deployment. The proper mitigation of this situation is by appropriate network planning and antenna placement (making sure that all area under coverage is reasonably "illuminated").

Figure 21:
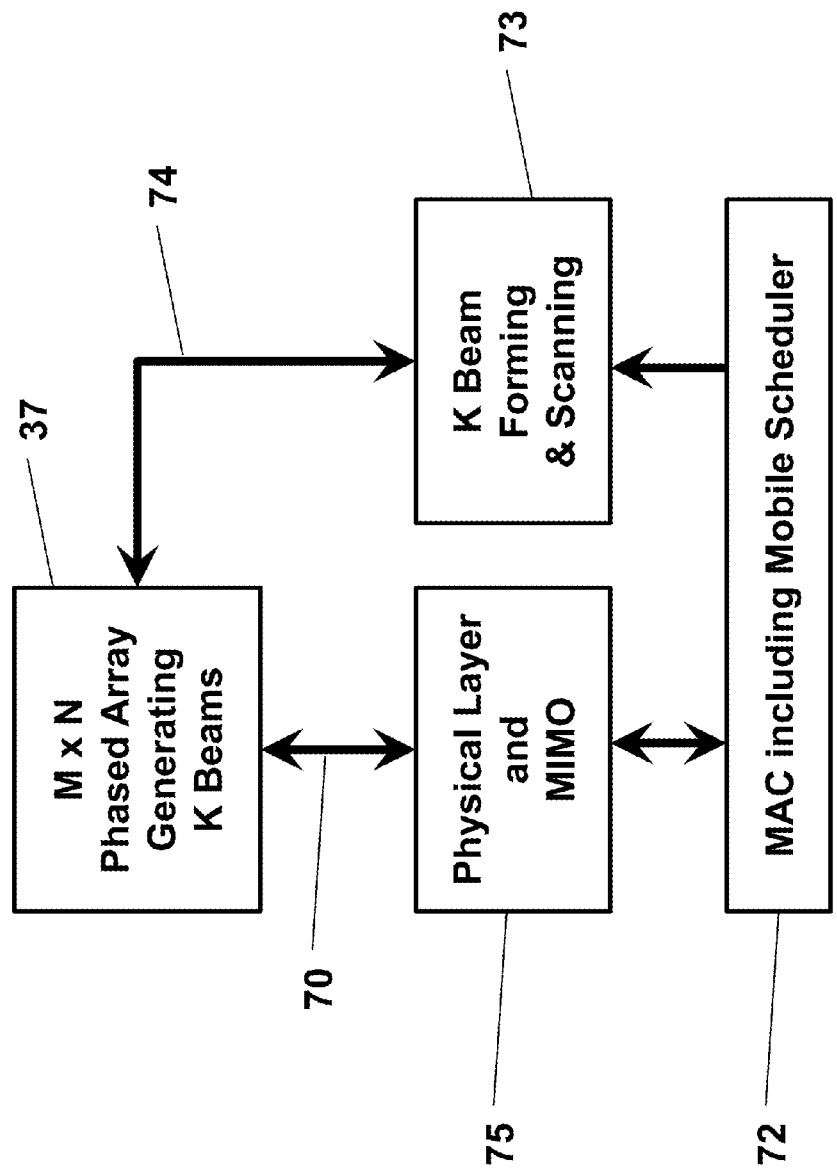
FIG. 21 depicts a diagram of a base station subsystem in accordance with one embodiment of the present disclosure.

In highly scattering environments such as downtown cities, it may not always be possible to schedule the mobiles such as to have a simple NLOS case. This is the general NLOS case. In this situation, at least two beams in the beam patterns cover some of the mobiles. However, this is no different from conventional spatial diversity MIMO with clients having a single antenna and can be addressed with the same processing solution. FIG. 21 shows a subsystem similar to that of FIG. 17 but enhanced with standard MIMO processing 75. Compared to conventional MIMO systems, the agile beams technique has the added benefit that the phased array generates a pronounced and programmable spatial filtering effect in the RF front end increasing the SNIR of the RF signals.

Beam Assignment Algorithms

In the above discussion, it was assumed that, for example, the scheduler 72 knows at all times which beam is appropriate for each mobile. In such a case, there are several possible ways for the scheduler 72 to acquire and maintain this knowledge. A technique based on simple searches is discussed below.

First, we assume that at a certain time after a system operating in accordance with the agile beams technique is turned on, all mobiles are assigned to correct beams and communicate with the base station in coordination with sector scanning as shown in FIG. 16. As mobiles move around the sector, some of them will move away from their assigned covered area towards a different area covered at a different time by a different beam. However, because the system communicates with each mobile very often due to fast scanning, the "departure" from one beam will be indicated by a monotonic decrease in channel quality. This may trigger the scheduler 72 to request the mobile to start sending control data in time slots corresponding to other beam patterns. It is reminded that the base station has the capability to maintain contact with the entire sector at all times (due to properly designed multiple beams and scans). For an LTE example that has been considered, within only 5 ms the scheduler 72 should know if the mobile "appears" in another beam and which beam that is. Also, the scheduler 72 may monitor the mobile channel quality and at the appropriate time (channel quality in new beam better than in old beam) it will switch the mobile to the new beam.

The above-described simple algorithm based on "blind" searches is feasible because the system is agile and there are many possibilities to exchange information between mobiles and the base station. Even in the general NLOS case, these searches will rapidly converge towards the optimum assignment of mobiles to beams. A high-level interpretation of this algorithm is that mobiles with high channel quality are kept in synchronism with the sector scanning process while the mobiles with degrading channel quality are placed in a deterministic asynchronous operation (mostly control data) with the scanning pattern until a new optimum is found.

The starting of the system can be designed to gradually bring in mobiles one by one and place each in a corresponding optimum beam before bringing in additional mobiles. More sophisticated mobile-assignment principles are possible, such as based on GPS coordinate reporting by mobiles and GPS maps stored and dynamically updated in the base station. Yet another possible principle for beam assignment algorithms is using mobile reporting of the neighbor channel quality.

In sum, the present disclosure describes techniques for achieving average spectrum efficiency close to the peak spectrum efficiency. This represents up to a tenfold increase in wireless system capacity with a low cost network upgrade.

At this point it should be noted that techniques for achieving high average spectrum efficiency in a wireless system in accordance with the present disclosure as described above may involve the processing of input data and the generation of output data to some extent. This input data processing and output data generation may be implemented in hardware or software. For example, specific electronic components may be employed in a base station or similar or related circuitry for implementing the functions associated with achieving high average spectrum efficiency in a wireless system in accordance with the present disclosure as described above. Alternatively, one or more processors operating in accordance with instructions may implement the functions associated with achieving high average spectrum efficiency in a wireless system in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method of communicating with a wireless station, the method comprising:
   defining a plurality of independent spot beams to be generated by a beam-forming device, each spot beam of the plurality of independent spot beams aimed in a different direction and intersecting a different region of a planar finite area in space, wherein the directions of the plurality of independent spot beams vary in both azimuth and elevation and wherein the regions of the planar finite area of space intersected by the plurality of independent spot beams is a two-dimensional array of intersected regions;
   defining a set of multiple beam groups, each beam group being a different subset of spot beams among the plurality of independent spot beams, each beam group of the set of multiple beam groups including a different subset of spot beams of the plurality of independent spot beams;
   repeatedly cycling through the set of beam groups, wherein cycling through the set of beam groups involves activating at different times each beam group of the set of multiple beam groups, and wherein activating a beam group involves simultaneously generating multiple of the spot beams of that beam group;
   identifying a spot beam among the plurality of independent spot beams that yields a best communication link with the wireless station; and
   scheduling communications with the wireless station to occur when the beam group of which the identified spot beam is a member is being activated.

2. The method of claim 1, wherein each beam group of the set of multiple beam groups includes more than one spot beam of the plurality of independent spot beams.

3. The method of claim 2, wherein each spot beam of the plurality of independent spot beams is a member of only one of the beam groups of the set of multiple beam groups.

4. The method of claim 2, wherein cycling through the set of beam groups involves activating in succession each beam group of the set of multiple beam groups.

5. The method of claim 4, further comprising communicating with the wireless station via the identified spot beam during times when the beam group of which the identified spot beam is a member is being activated.

6. The method of claim 4, wherein scheduling communications involves communicating scheduling information to the wireless station, wherein the scheduling information indicates when the identified spot beam will be available for use by the wireless station.

7. The method of claim 4, wherein repeatedly cycling through the set of beam groups is performed such that there is no time during the cycling when none of the beam groups among the set of beam groups is being activated.

8. The method of claim 4, wherein the beam-forming device comprises a two-dimensional array of antenna elements.

9. The method of claim 4, wherein for each beam group of the set of beam groups the different regions of the planar finite area that are intersected by the spot beams of that beam group are separated from each other by at least one region that is intersected by a spot beam of another beam group among the set of beam groups.

10. The method of claim 4, wherein spot beams of each beam group intersect regions of the planar finite area that are different from the regions intersected by spot beams of the other beam groups.

11. The method of claim 4, further comprising exchanging control information with the wireless station at times other than when the beam group of which the identified spot beam is a member is being activated.

12. The method of claim 4, further comprising:
   generating a wide static beam which remains on while repeatedly cycling through the set of beam groups, said wide static beam simultaneously covering all of the regions that are intersected by the plurality of independent spot beams; and
   using the static beam to communicate control information to wireless clients, including the wireless station, in all of the regions that are intersected by the plurality of independent beams.

13. The method of claim 12, wherein the control information includes time scheduling information.

14. An apparatus for communicating with a wireless station, the apparatus comprising:
   a multi-transceiver radio system to be connected to an antenna array, the multi-transceiver radio system being configured to generate a plurality of independent spot beams by the antenna array, each spot beam of the plurality of independent spot beams intersecting a different region of a planar finite area in space, wherein the directions of the plurality of independent spot beams vary in both azimuth and elevation and wherein the regions of the planar finite area of space intersected by the plurality of independent spot beams is a two-dimensional array of intersected regions, the plurality of independent spot beams grouped to form a set of multiple beam groups, each beam group of the set of multiple beam groups being a corresponding different subset of spot beams of the plurality of independent spot beams; and
   a scheduling system to control the multi-transceiver radio system, the scheduling system being configured to: (1) repeatedly cycle through the set of beam groups by causing the multi-transceiver radio system to repeatedly cycle through the set of multiple beam groups, wherein cycling through the set of multiple beam groups involves activating at different times each beam group of the set of multiple beam groups, and wherein activating a beam group involves simultaneously generating multiple of the spot beams of that beam group; (2) identify a spot beam among the plurality of independent spot beams that yields a best communication link with the wireless station; and (3) schedule communications with the wireless station to occur when the beam group of which the identified spot beam is a member is being activated.

15. The apparatus of claim 14, wherein each beam group of the set of multiple beam groups includes more than one spot beam of the plurality of independent spot beams.

16. The apparatus of claim 15, wherein each spot beam of the plurality of independent spot beams is a member of only one of the beam groups of the set of multiple beam groups.

17. The apparatus of claim 15, wherein cycling through the set of beam groups involves activating in succession each beam group of the set of multiple beam groups.

18. The apparatus of claim 17, further comprising the antenna array, wherein the antenna array is a two-dimensional array of antenna elements.

19. The apparatus of claim 17, further comprising a communication system for communicating with the wireless station when the beam group of which the identified spot beam is a member is being activated.

20. The apparatus of claim 17, wherein the multi-transceiver radio system is configured to generate a wide static beam which remains on while repeatedly cycling through the set of beam groups, said wide static beam simultaneously covering all of the regions that are intersected by the plurality of independent spot beams and wherein the multi-transceiver radio system is configured to use the static beam to communicate control information to wireless clients, including the wireless station, in all of the regions that are intersected by the plurality of independent beams.

21. The apparatus of claim 20, wherein the control information includes time scheduling information.

* * * * *